United States Patent
Jiang

(10) Patent No.: US 9,929,684 B2
(45) Date of Patent: Mar. 27, 2018

(54) MOTOR CONTROL SYSTEM AND METHOD OF CONTROLLING A MOTOR

(71) Applicant: MARVELL INTERNATIONAL LTD., Hamilton (BM)

(72) Inventor: Quan Jiang, Singapore (SG)

(73) Assignee: Marvell International Ltd., Hamilton (BM)

( * ) Notice: Subject to any disclaimer, the term of this patent is extended or adjusted under 35 U.S.C. 154(b) by 56 days.

(21) Appl. No.: 14/913,175

(22) PCT Filed: Aug. 25, 2014

(86) PCT No.: PCT/SG2014/000397
§ 371 (c)(1),
(2) Date: Feb. 19, 2016

(87) PCT Pub. No.: WO2015/026300
PCT Pub. Date: Feb. 26, 2015

(65) Prior Publication Data
US 2016/0211781 A1    Jul. 21, 2016

(30) Foreign Application Priority Data
Aug. 23, 2013 (SG) ............... 201306430-8

(51) Int. Cl.
*H02P 6/18* (2016.01)
*H02P 6/182* (2016.01)
*H02P 6/08* (2016.01)

(52) U.S. Cl.
CPC ............... *H02P 6/182* (2013.01); *H02P 6/08* (2013.01)

(58) Field of Classification Search
CPC .. H02P 6/182; H02P 27/08; H02P 6/28; H02P 6/08; H02P 6/157; H02P 27/06
See application file for complete search history.

(56) References Cited

U.S. PATENT DOCUMENTS 5,585,708 A * 12/1996 Richardson ......... H02M 5/4585
                                                        318/722
6,157,150 A * 12/2000 Konecny .................. H02P 6/18
                                                        318/400.01
(Continued)

FOREIGN PATENT DOCUMENTS

JP       2011223765 A * 11/2011 ............ H02P 6/182
WO    WO-2011/129297 A1    10/2011

OTHER PUBLICATIONS

International Search Report regarding Application No. PCT/SG2014/000397, dated Nov. 13, 2014; ISA/AU.
(Continued)

*Primary Examiner* — Bentsu Ro
*Assistant Examiner* — Thai Dinh

(57) ABSTRACT

In various embodiments, a method of controlling a motor and motor control system may be provided. The method may include applying exciting pulse-width-modification (PWM) or continuous sinusoidal voltages to a motor. The method may further include measuring one or more the applied exciting voltages to the motor. The method may further include measuring one or more currents from the motor. The method may also include calculating one or more back electromotive force (BEMF) voltages based on the one or more currents. The method may include adjusting the exciting voltages based on the one or more back electromotive force (BEMF) voltages and the phase angle difference between the calculated back EMF voltages and the measured currents. The motor control system may include the various detecting circuits of the exciting voltages and the motor currents from the motor with low pass filters.

18 Claims, 25 Drawing Sheets

(56) References Cited

U.S. PATENT DOCUMENTS

| | | | | |
|---|---|---|---|---|
| 6,335,600 B1* | 1/2002 | Kasai | ................... | B62D 5/0487 |
| | | | | 318/434 |
| 6,570,360 B1 | 5/2003 | Freeman | | |
| 7,116,070 B2* | 10/2006 | MacKay | ................... | H02P 8/34 |
| | | | | 318/400.11 |
| 8,004,220 B2* | 8/2011 | Sparey | ................... | H02P 6/182 |
| | | | | 318/400.14 |
| 2004/0100216 A1 | 5/2004 | Makaran et al. | | |
| 2008/0265808 A1* | 10/2008 | Sparey | ................... | H02P 6/182 |
| | | | | 318/139 |
| 2011/0248663 A1* | 10/2011 | Yamakawa | ............. | B60L 11/08 |
| | | | | 318/805 |

OTHER PUBLICATIONS

Written Opinion regarding Application No. PCT/SG2014/000397, dated Nov. 13, 2014.

* cited by examiner

400

```
apply one or more exciting
voltages to a motor
```
402

```
measure one or more currents
from the motor
```
404

```
calculate one or more back
electromotive force voltages
based on the one or more
currents
```
406

```
adjust the exciting voltages based on
the one or more back electromotive
force voltages
```
408

$\theta = 0$
$T_l = T_{em}$

900b

900c

$\theta > 0$
$T_l > T_{em}$

900d

900e

$\theta < 0$
$T_l < T_{em}$

900f

MOTOR CONTROL SYSTEM AND METHOD OF CONTROLLING A MOTOR

CROSS-REFERENCE TO RELATED APPLICATIONS

This application is a U.S. National Phase Application under 35 U.S.C. 371 of International Application No. PCT/SG2014/000397, filed 25 Aug. 2014 and published in English as WO 2015/026300 A1 on 26 Feb. 2015, which claims the benefit of and priority to Singapore patent application No. 201306430-8, filed 23 Aug. 2013, the contents of both of the above applications are hereby incorporated by reference in their entirety for all purposes.

TECHNICAL FIELD

Various aspects of this disclosure relate to methods of controlling motors and motor control systems for controlling motors.

BACKGROUND

Constant speed control of a spindle motor is always pursued by industry. A typical application of such a speed control is hard disk drive (HDD) spindle motors. Now HDD spindle motors employ a zero-current-window (ZCW) method to detect the transient moments of zero-crossing points (ZCP) of each phase back electromotive force (BEMF) voltage. The rotor position is detected and speed can be calculated to realize a close-loop control with a speed jitter around ±0.1~0.2%.

SUMMARY

In various embodiments, a method of controlling a motor may be provided. The method may include applying one or more exciting voltages to a motor. The method may further include measuring one or more currents (and one or more applied exciting voltages) from the motor. The method may also include calculating one or more back electromotive force (BEMF or back EMF) voltages based on the one or more currents (and the measured exciting voltages). The method may additionally include adjusting the exciting voltages based on the one or more BEMF voltages (and the phase angle difference between the BEMF voltages and the currents).

In various embodiments, a motor control system for controlling a motor may be provided. The motor control system may include an inverter circuit configured to apply exciting voltages to the motor. The motor control system may further include a current (and a voltage) detection circuit coupled with the inverter circuit. The current (and the voltage) detection circuit may be configured to measure one or more currents (and exciting voltages) from the motor. The motor control system may also include a control unit coupled with the inverter circuit and the current detection circuit. The control unit may be configured to calculate one or more BEMF voltages based on the currents (and measured voltages). The control unit may be further configured to modify the exciting voltages based on the one or more BEMF voltages (and the phase angle difference between the back EMF voltages and the currents).

BRIEF DESCRIPTION OF THE DRAWINGS

The invention will be better understood with reference to the detailed description when considered in conjunction with the non-limiting examples and the accompanying drawings, in which:

FIG. 1 is a schematic illustrating a method of controlling a motor according to various embodiments.

DETAILED DESCRIPTION

Figure 2:
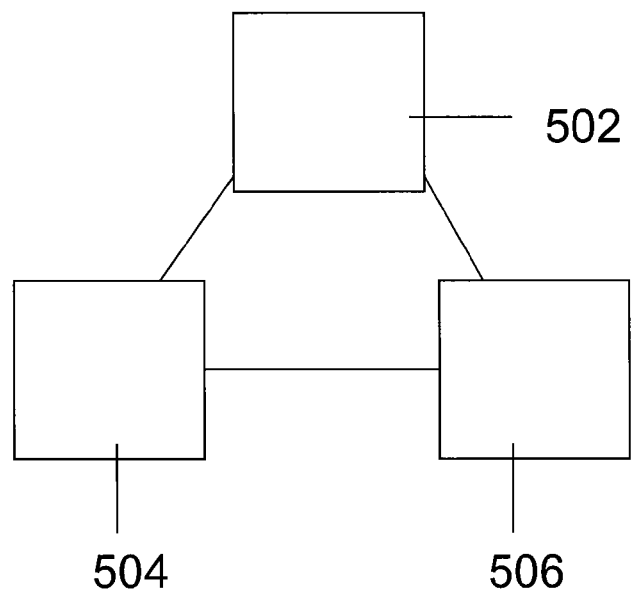
FIG. 2 is a schematic illustrating a motor control system for controlling a motor according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The zero-current-window produces additional or larger harmonic currents which cause additional or stronger vibrations and acoustic noises, more significant to axial field PCB coil motors. Also the speed jitter based On this method depends on the spindle motor pole jitter and three phase symmetry of motor phase windings as well as the stator and rotor mechanical eccentricities.

Due to the abovementioned issues, a zero-current-window free speed-control method may be required. Voltage/frequency (V/F) motor control may be a candidate but it may need a big over-exciting phase current with lower efficiency and it also loses synchronization if a sudden change of load torque occurs.

FIG. 1 is a schematic 400 illustrating a method of controlling a motor according to various embodiments. The method may include, in 402, applying one or more exciting voltages to a motor. The method may further include, in 404, measuring one or more currents from the motor. The method may also include, in 406, calculating one or more back electromotive force (EMF) voltages based on the one or more currents. The method may additionally include, in 408, adjusting or modifying the exciting voltages based on the one or more back electromotive force voltages.

In other words, a method of controlling a motor may be provided. The method may include applying one or more exciting or actuating voltages to a motor. The method may include measuring one or more currents flowing through the motor. The method may also include computing one or more back electromotive force (EMF) voltages based on the measured currents, (and may be further based on direct current link voltage (DC-link voltage) or motor voltages (motor terminal voltages)). The method may also include adjusting the exciting or actuating voltages based on the one or more back electromotive force voltages (and the phase angle difference between the calculated BEMF voltage and the measured currents).

The motor may be a permanent magnet (PM) motor. The motor may be a multi-phase motor such as a two phase motor or a three phase motor. In various embodiments, two exciting voltages may be applied for a two phase motor. Three exciting voltages may be applied for a three phase motor. In various embodiments, an exciting voltage may be applied to the motor via an intermediate circuit. The exciting voltage may be spilt into, for instance, two voltages by the intermediate circuit. One of the voltages may have its phase shifted relative to the other voltage. The two voltage may be applied to a two phase motor.

The method may further include adjusting the exciting voltages further based on the one or more currents. In other words, adjusting the exciting voltages may be further based on the one or more currents in addition to the one or more back electromotive force voltages.

Adjusting the exciting voltages may include calculating a current phase based on the one or more currents. Adjusting the exciting voltages may also include calculating an back electromotive force voltage phase based on the one or more back electromotive force voltages. Adjusting the exciting voltages may further include calculating a phase difference based on the current phase and the back electromotive force voltage phase. Adjusting the exciting voltages may additionally include adjusting the exciting voltages based on the phase difference.

Calculating the phase difference may include subtracting the back electromotive force voltage phase from the current phase to calculate the phase difference.

Adjusting the exciting voltages may further include applying a low pass phase difference filter to the phase difference (the phase difference based on the current phase and the back electromotive force voltage phase) to generate a filtered phase difference signal and adjusting the exciting voltages based on the filtered phase difference signal.

Adjusting the exciting voltages may further include decreasing amplitudes of the exciting voltages to slow down speed of rotation of the motor when the phase difference is negative and increasing the amplitudes of the exciting voltages to increase the speed of rotation of the motor when the phase difference is positive.

In other words, when the current phase lags the back electromotive force voltage phase (i.e. the rotor magnetic field may be in front of or faster than the magnetic field of the exciting currents), the amplitude of the exciting voltages may be decreased to generate a smaller torque for slowing down speed of rotation of the motor. When the current phase leads the back electromotive force voltage phase(i.e. the rotor magnetic field may be behind or slower than the magnetic field of the exciting current), the amplitude of the exciting voltages may be increased to generate a larger torque for increasing speed of rotation of the motor.

The exciting voltages may be applied to a stator of the motor. The one or more currents may be detected from the stator of the motor.

The method may further include measuring a DC-link voltage (from the inverter circuit). The method may further include calculating one or more exciting voltages further based on the DC-link voltage. The method may also include applying a voltage low pass filter to the DC-link voltage to generate a filtered DC-link voltage signal; and calculating one or more exciting voltages further based on the filtered DC-link voltage signal.

The method may additionally include measuring one or more motor voltages or exciting voltages from the inverter (may also be referred to as motor terminal voltages). The method may further include calculating one or more back electromotive force voltages further based on the measured motor voltages. The method may also include applying a voltage low pass filter to each of the one or more motor voltages to generate one or more filtered motor voltage signals. The method may further include calculating the one or more back electromotive force voltages further based on the one or more filtered motor voltage signals.

The method may include applying a current low pass filter to each of the one or more currents to generate one or more filtered current signals. Calculating the one or more back electromotive force voltages may be based on the one or more filtered current signals.

Adjusting the exciting voltages may be further based on the one or more filtered current signals.

The exciting voltages may be voltages varying at a fixed frequency. The exciting voltages may be sinusoidal pulse-width modification (PWM) voltages.

The motor may be a multi-phase motor having multiple phase coils.

Applying the exciting voltages may include applying an exciting voltage to each phase coil of the multi-phase motor. Measuring the one or more currents may include measuring one current from each phase coil of the multi-phase motor. Calculating the one or more back electromotive force voltages may include calculating one back electromotive force voltage in each phase coil of the multi-phase motor based on the current in each phase coil of the multi-phase motor. Adjusting the exciting voltages may include adjusting the exciting voltages based on the back electromotive force voltages.

Adjusting the exciting voltages may be further based on the currents.

Applying the exciting voltages may include applying an exciting voltage to each phase coil of the multi-phase motor. Measuring the one or more currents may include measuring a first current from a phase first coil of the multiple phase coils of the multi-phase motor, and calculating a last current in a last phase coil in each phase coil of the multi-phase motor based on the current. Calculating the one or more back electromotive force voltages may include calculating one back electromotive force voltage in each phase coil of the multi-phase motor based on the currents measured or calculated in each coil of the multi-phase motor. Adjusting the exciting voltages may include adjusting the exciting voltages based on the back electromotive force voltages.

Measuring the one or more currents may further include measuring one or more subsequent currents from one or more subsequent coils of the multiple coils of the multi-phase motor and calculating the last current further based on the one or more subsequent currents.

Adjusting the exciting voltages may be further based on the currents. The motor may be a three-phase motor having three phase coils.

FIG. 2 is a schematic 500 illustrating a motor control system for controlling a motor according to various embodiments. The motor control system may include an inverter circuit 502 configured to apply or for applying one or more exciting voltages to the motor. The motor control system may further include a current detection circuit 504 coupled with the inverter circuit. The current detection circuit 504 may be configured to measure one or more currents from the motor. The motor control system may also include a control unit 506 coupled with the inverter circuit 502 and the current detection circuit 504. The control unit 506 may be configured to calculate one or more back electromotive force voltages based on the one or more currents. The control unit 506 may be further configured to modify or adjust the exciting voltages based on the one or more back electromotive force voltages.

In other words, the motor control system may include an inverter circuit 502 exciting or actuating voltages to a motor. The motor control system may further include a current detection circuit 504 electrically connected to the inverter circuit 502. The current detection circuit 504 may be configured to detect or measure one or more currents flowing in the motor. The motor control system may also include a control unit 506 electrically connected to the inverter circuit 502 and the current detection circuit 504. The control unit 506 may be configured to calculate one or more back electromotive force voltages based on the one or more currents measured or detected. The control unit 506 may be further configured to adjust the exciting voltages applied to the motor based on the one or more back electromotive force voltages calculated.

In various embodiments, the control unit 506 may be further configured to modify or adjust the exciting voltages based on the one or more currents.

In various embodiments, the current detection circuit 504 may alternatively or additionally be configured to be coupled to the motor.

The control unit 506 may be further configured to calculate a current phase based on the one or more currents. The control unit 506 may be further configured to calculate a back electromotive force voltage phase based on the one or more back electromotive force voltages. The control unit 506 may be further configured to calculate a phase difference based on the current phase and the back electromotive force voltage phase. The control unit 506 may be further configured to modify or adjust the exciting voltages based on the phase difference.

The control unit 506 may be further configured to calculate a current phase based on the one or more currents. The control unit 506 may be further configured to calculate a back electromotive force voltage phase based on the one or more back electromotive force voltages. The control unit 506 may be further configured to calculate a phase difference based on the current phase and the back electromotive force voltage phase. The control unit 506 may be further configured to modify or adjust the exciting voltages based on the phase difference.

The control unit 506 may be further configured to calculate the phase difference by subtracting the back electromotive force voltage phase from the current phase.

The control unit 506 may be a phase difference filter, the phase difference filter configured to generate a filtered phase difference signal. The control unit 506 may be configured to modify or adjust the exciting voltages based on the filtered phase difference signal.

The control unit 506 may be configured to decrease amplitudes of the exciting voltages to slow down the speed of rotation of the motor when the phase difference is negative and to increase the amplitudes of the exciting voltages to increase the speed of rotation of the motor when the phase difference is positive.

The motor control system may further include a DC-link voltage detection circuit configured to be coupled with the inverter circuit 502. The DC-link voltage detection circuit may be configured to measure a DC-link voltage from the inverter circuit 502.

The motor control system may also include a voltage low pass filter coupled to the DC-link voltage detection circuit and the control unit 506. The voltage low pass filter may be configured to generate a filtered DC-link voltage signal based on the DC-link voltage. The one or more back electromotive force voltages may be calculated based on the filtered DC-link voltage signal.

The DC-link voltage detection circuit may be the inverter circuit.

The motor control system may also include a motor voltage detection circuit configured to be coupled with the motor. The motor voltage detection circuit (may also be referred to as sampling resistance voltage detection circuit) may be configured to detect one or more motor voltages (may also be referred to as motor terminal voltages or sampling resistance voltages). The one or more back electromotive force voltages may be calculated based on the one or more motor voltages.

The motor control system may additionally include a voltage low pass filter coupled to the motor voltage detection circuit and the control unit 506. The voltage low pass filter may be configured to generate one or more filtered motor voltage signals based on the one or more motor voltages. The one or more back electromotive force voltages may be calculated based on the one or more filtered motor voltage signals.

The control unit 506 may include one or more current detection low pass filters. Each current detection low pass filter may be configured to filter each of the one or more currents to generate one or more filtered current signals. The one or more back electromotive force voltages may be calculated based on the one or more filtered current signals. Exciting voltages are adjusted based on the one or more back electromotive force voltages. The inverter circuit 502 or motor control system may be configured to adjust the exciting voltages based on the one or more back electromotive force voltages.

Exciting voltages are adjusted further based on the one or more filtered current signals. The inverter circuit 502 or motor control system may be configured to adjust the exciting voltages further based on the one or more filtered current signals.

The control unit 506 may include an analog to digital converter circuit coupled to the low pass filters. Each of the low pass filters may include an operational amplifier.

The control unit may further include a processing circuit coupled to the inverter circuit. The processing circuit may be configured to calculate the one or more back electromotive force voltages based on the one or more currents. The processing circuit may be further configured to control adjusting the exciting voltages based on the one or more back electromotive force voltages. The processing circuit may be further configured to control adjusting the exciting voltages based on the one or more currents.

The motor control system may include the motor. The motor may include a rotor and a stator. The inverter circuit may be configured to apply exciting voltages to the stator. The current detection circuit may be configured to measure one or more currents from the stator.

The rotor may include a permanent magnet. The motor may be a multi-phase motor. The motor may be a synchronous motor.

The motor may be one of a radial field surface mounted permanent synchronous motor (SPMSM), an axial field surface mounted permanent synchronous motor (SPMSM), a radial field interior mounted permanent magnet synchronous motor (IPMSM) or an axial field interior mounted permanent magnet synchronous motor (IPMSM).

The exciting voltages may be or may include voltages varying at a fixed frequency. The exciting voltages may be sinusoidal voltages. The sinusoidal voltages may be pulse width modification (PWM) sinusoidal voltages or continuous sinusoidal voltages, such as outputs from linear amplifiers.

Various embodiments may relate to a voltage/frequency (V/F) control system. The control system may be configured to drive permanent magnet (PM) spindle motors, in particular axial field or surface-mounted PM synchronous motors. Various embodiments may be configured to control the motor to spin at a substantially constant speed with small current harmonic components for low acoustic noise, low current fundamental amplitude for high efficiency and small speed jitter.

Various embodiments may relate to a motor control system for controlling a three-phase motor as well as a method of controlling a three-phase motor. The three-phase motor may have three phase coils. The method of controlling the motor may include applying a three phase pulse-width modification (PWM) exciting voltages with a fixed frequency to drive the motor, e.g. 540 Hz for 5,400 rpm speed of 12-pole spindle motor. The method may further include applying low pass filters to three terminal (or phase) voltages or one DC-link voltage. The method may also include applying low pass filters to two or three phase currents among three phase currents. The method may include measuring the filtered voltage(s) to obtain filtered three phase voltages and measuring the filtered phase currents to obtain filtered three phase currents. The method may also include calculating the angle of stator current vector. The method may additionally include calculating the phase back EMF by substrating the voltage drops on the resistance and inductance from the measured phase voltages. The method may also include calculating the angle or phase of back EMF vector. The method may also include obtaining the phase difference between current vector angle and back EMF vector angle. A further low pass filter (LPF) may be applied to the phase difference. When the difference is positive, i.e., current vector angle is larger than the back EMF vector angle, bigger amplitude phase voltage may be applied. In such a case, the rotor magnet field may lag or lead the magnet field generated by phase exciting currents. Bigger currents may generate a stronger torque to pull the rotor to follow exciting magnetic field, i.e., to keep synchronously rotating with exciting current angular speed. When the difference is negative, i.e. current vector angle is smaller than the back EMF vector angle, smaller amplitude phase voltage may be applied. The rotor magnet field may be in front of or faster than the magnet field of phase exciting currents. So smaller currents may generate a smaller torque to slow the rotor to synchronously rotate with exciting current angular speed. When the phase difference is zero, the current vector is ideally synchronous with back EMF vector and then the motor operates at the smallest current fundamental amplitude and with the smallest input power. A Proportional-Integral control or sliding-mode control or other advanced control may be needed to dynamically adjust the amplitude of the applied three phase voltages according to the phase difference between the current vector and back EMF vector. The phase difference may always be close to zero and may be kept to zero as the load torque is changed. In order to reduce the cost of the system, different inverters and sampling circuits may be provided for the trade-off design of the system performance and cost. The ideal status may not be a robust stable operation point. Various embodiments may require a robust and anti-oscillation angle-amplitude controller.

Since various embodiments employs neither conventional zero-current window method to detect the transient moments of zero-crossing points of each phase back EMF nor an over-exciting current V/F mode, various embodiments may realize the smallest current harmonics and high efficiency as well as low speed jitter. Therefore, various embodiments may be widely used in hard disk drive industry and other industries through developing unique comb chip of spindle motors or with microcontroller units (MCUs).

Various embodiments may employ three phase exciting frequency-fixed voltages to drive a PM motor and may keep the motor synchronously spinning at the synchronous speed through dynamically adjusting the exciting voltage amplitude. The speed jitter of the spindle motor may be greatly reduced to +/−0.025%, much better than +/−0.1~0.2% requirement of present required speed jitter specification. Also the acoustic noises of the driven motor may be greatly reduced, which is more significant for axial field PCB coil PM spindle motors. At the same time, the motor may operate at or close to the highest efficiency state.

Since a multi-channel shared 12~16 bits ADC is a must, the cost may not the cheapest but may at a reasonable and affordable. Through the proposed hardware sampling circuits, various embodiments may use few or no operational amplifiers to compensate the cost of an integrated ADC.

In general, the benefits of smaller speed jitter, lower acoustic noise, highest operating efficiency and less complex single-input and single-output (SISO) control may overcame a little increase of ADC hardware cost in many applications as the fabrication cost of an integrated ADC is cheaper and cheaper.

Various embodiments may control a motor to spin at substantially constant speed with small speed jitters. Various embodiments may generate less and smaller human-audible hearing ranges of harmonic currents. Various embodiments may achieve lower acoustic noise. Various embodiments may achieve lower power consumption of spindle motor. Various embodiments may have a comb drive chip which is affordable.

Various embodiments may relate to using voltage/frequency (V/F) control. Since V/F control mode does not open zero-current-window to detect the rotor position, there may be no speed feedback and the motor may run at synchronous motoring mode. In order to increase the motor running efficiency and reduce the acoustic noise and torque ripple, the permanent magnet motors may be designed and fabricated with the sinusoidal back EMFs. Therefore, the sinusoidal PWM voltages and, thus, sinusoidal phase currents may be used to drive PM motor at the synchronous mode, i.e., the motor rotor may run at the synchronous speed, i.e., the rotating angular velocity of the stator exciting currents or equivalent stator electromagnetic field which is generated by the three phase currents.

The current phase may also be referred to as current vector angle or current phase angle. The back EMF voltage phase may be referred to as back EMF vector angle or back EMF phase angle. The phase difference between the current phase and the back EMF voltage phase and the current phase may be referred to as the phase difference angle.

Figure 3A:
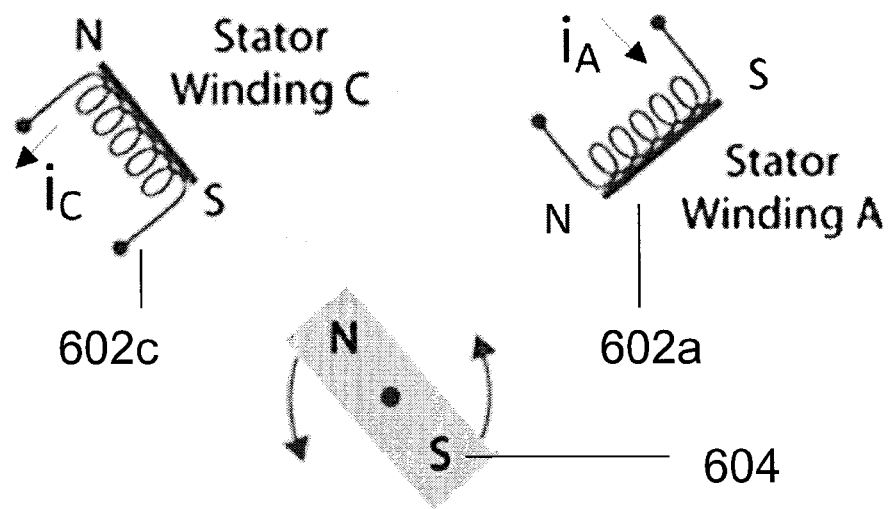
FIG. 3A is a schematic illustrating a three-phase motor according to various embodiments.
Figure 3A:
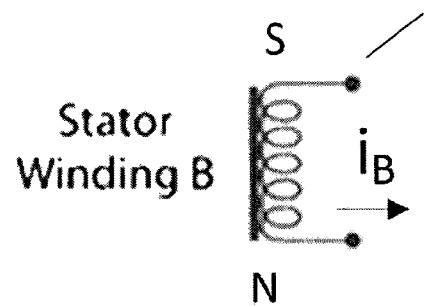

FIG. 3A is a schematic 600a illustrating a three-phase motor according to various embodiments. The three-phase motor may have three phase coils 602a, 602b, 602c. The motor may include a rotor 604 and stator 606. The three phase coils 602a, 602b, 602c may be stator windings, i.e. the three phase coils 602a, 602b, 602c may be arranged in or may be part of the stator 606. Coil 602a may be referred to as Stator Winding A, coil 602b may be referred to as Stator Winding B and coil 602c may be referred to as Stator Winding C. The rotor 604 may include a permanent magnet. The motor may be a permanent magnet motor. The motor may be excited by three phase sinusoidal PWM currents ($i_A$, $i_B$, $i_C$).

The voltages may be provided by $$V_{A,exciting}(t) = V\sin(\omega_s t) \quad (1)$$

$$V_{B,exciting}(t) = V\sin\left(\omega_s t - \frac{2\pi}{3}\right)$$

$$V_{C,exciting}(t) = V\sin\left(\omega_s t + \frac{2\pi}{3}\right)$$

where $V_A$ is the exciting voltage applied to coil 602a, $V_B$ is the exciting voltage applied to coil 602b, $V_C$ is the exciting voltage applied to coil 602c, t is time, V is the voltage amplitude applied, and $\omega_s$ is the angular frequency of the the exciting voltages.

Figure 3B:
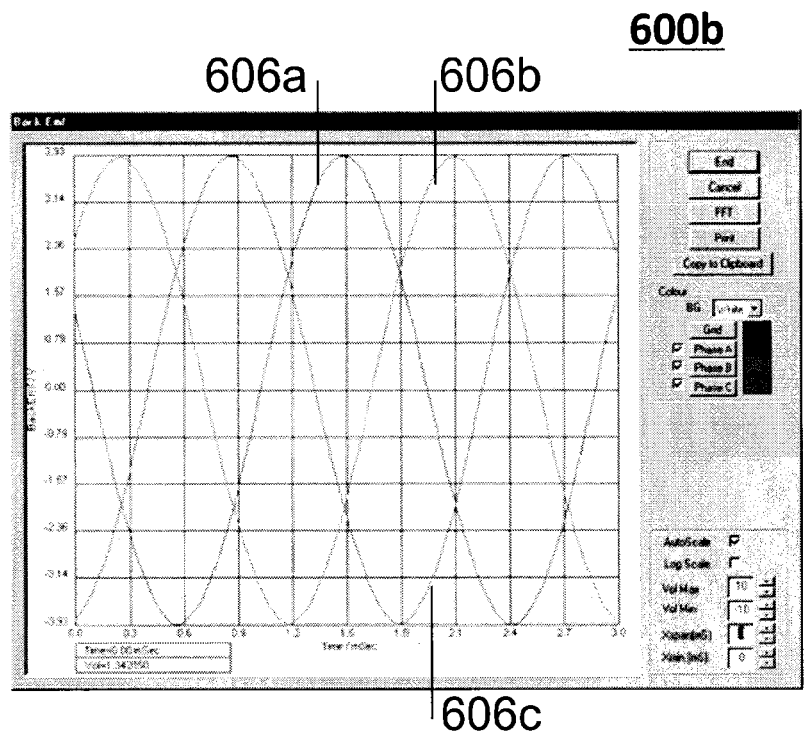
FIG. 3B is a plot of three phase BEMF voltages of a permanent motor with the sinusoidal waveforms.
Figure 3C:
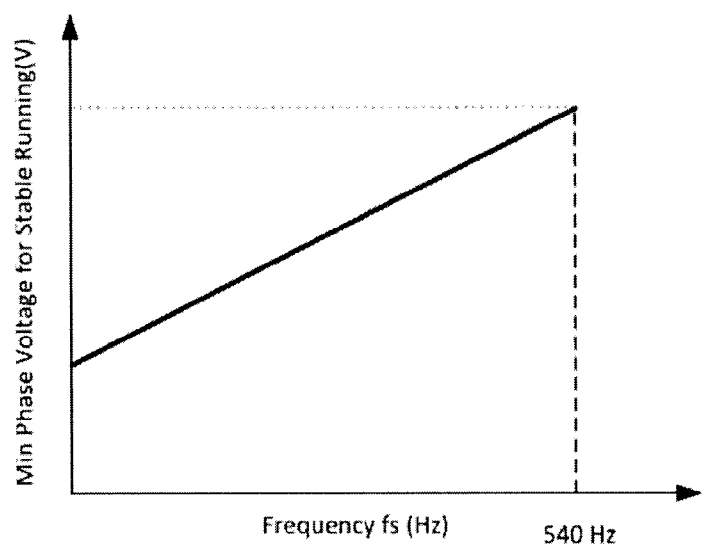
FIG. 3C is a plot of voltage against frequency illustrating a conventional open-loop voltage/frequency (V/F) mode.
Figure 3D:
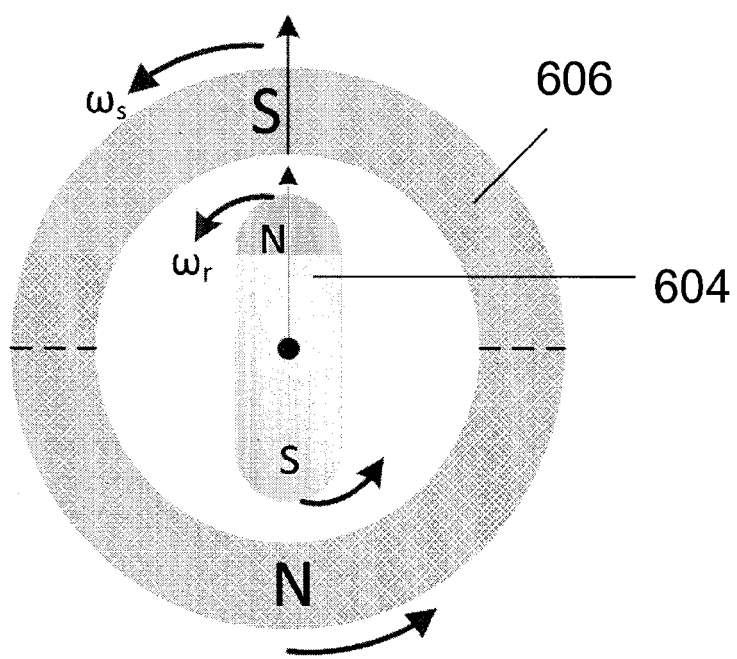
FIG. 3D is a magnetic field schematic showing another representation of the motor shown in FIG. 3A according to various embodiments.
Figure 3E:
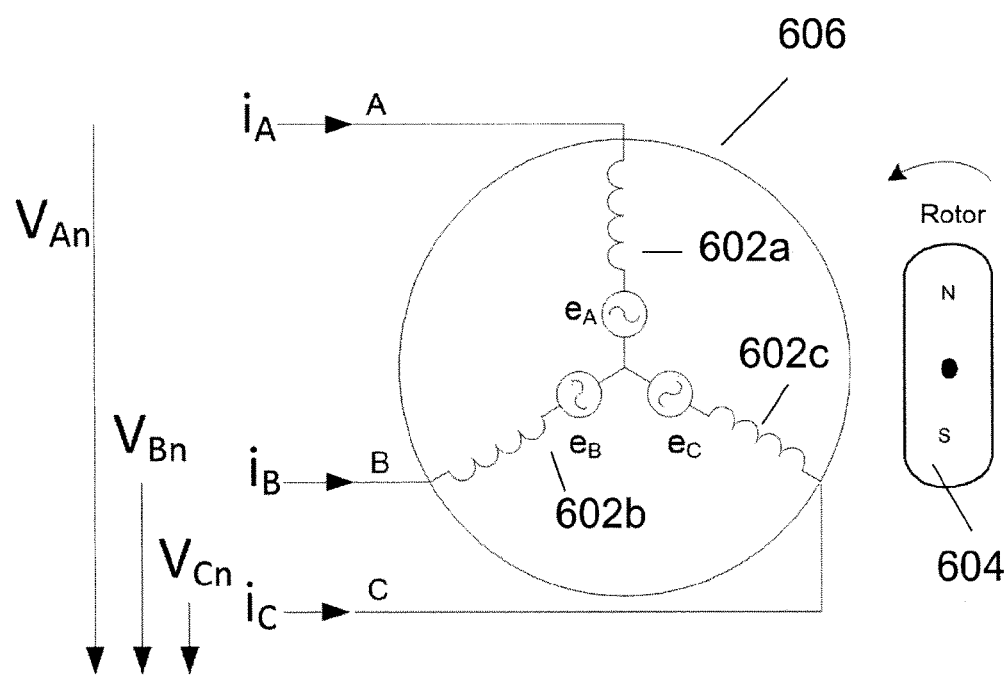
FIG. 3E is an equivalent circuit schematic showing a further representation of the motor shown in FIG. 3A according to various embodiments.

The currents may be provided by $$i_A(t) = I\sin(\omega_s t - \varphi) \quad (2)$$

$$i_B(t) = I\sin\left(\omega_s t - \frac{2\pi}{3} - \varphi\right)$$

$$i_C(t) = I\sin\left(\omega_s t + \frac{2\pi}{3} - \varphi\right)$$

where $i_A$ is the current at coil 602a, $i_B$ is the current at coil 602b, $i_C$ is the current at coil 602c, I is the current amplitude and $\varphi$ represents a phase difference between the phase currents and phase voltages. FIG. 3B is a plot 600b of voltage against time of the sinusoidal BEMF voltages $e_A$, $e_B$, $e_C$. 606a may represent $e_A$, 606b may represent $e_B$, 606c may represent $e_C$. FIG. 3C is a plot 600c of voltage against frequency illustrating a conventional open-loop voltage/frequency (V/F) open-loop mode. An over-exciting current may be applied to keep the rotor synchronizing with the stator electromagnetic field. $V_A$, $V_B$ and $V_C$ may be exciting voltages. The exciting voltages may be sinusoidal voltages. The sinusoidal voltages may be pulse width modification (PWM) sinusoidal voltages. FIG. 3D is a schematic 600d showing another representation of the motor shown in FIG. 3A according to various embodiments. FIG. 3E is a schematic 600e showing a further representation of the motor shown in FIG. 3A according to various embodiments. Phase voltages $V_{An}$, $V_{Bn}$, $V_{Cn}$ may be calculated based on measured motor voltages $V_A$, $V_B$, $V_C$ as described later. $V_{An}$ may refer to the potential difference between an outer end of coil A relative to the center tap of the motor 606. $V_{Bn}$ may refer to the potential difference between an outer end of coil B relative to the center tap of the motor 606. $V_{Cn}$ may refer to the potential difference between an outer end of coil C relative to the center tap of the motor 606. Motor voltages $V_A$, $V_B$, $V_C$ may be measured relative to the ground. Currents $i_A$, $i_B$ and $i_C$ may be measured. Motor voltages $V_A$, $V_B$, $V_C$ may be the same as the exciting voltages.

Figure 4A:
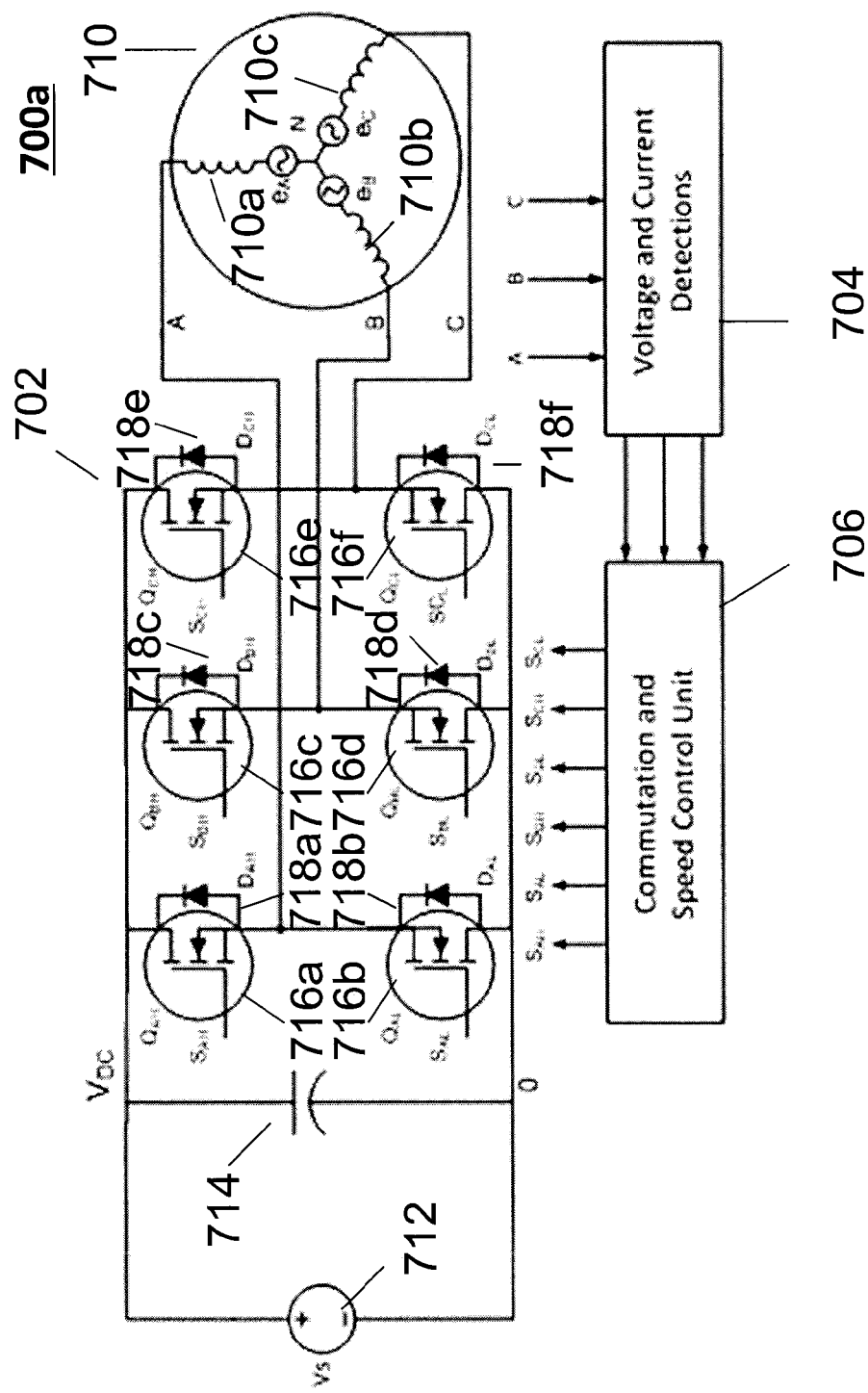
FIG. 4A is a schematic of a motor control system for controlling a motor according to various embodiments.

FIG. 4A is a schematic 700a of a motor control system for controlling a motor 710 according to various embodiments. The motor control system may include an inverter circuit 702 configured to apply exciting voltages to the motor 710. The inverter circuit 702 may be configured to convert a direct current (DC) voltage to an alternating current (AC) voltage and may be alternatively be referred to as a conversion circuit, in particular, a DC-to-AC conversion circuit. The motor control system may further include a current and voltage detection circuit 704 coupled with the inverter circuit 702. The current and voltage detection circuit 704 may be configured to measure one or more currents from the motor 710. The current and voltage detection circuits 704 may be further configured to measure motor voltages from the motor 710 or DC-Link voltage from the inverter circuit 702. The motor control system may also include a control unit 706 coupled with the inverter circuit 702 and the voltage and current detection circuit 704. The control unit 706 may be configured to calculate one or more back electromotive force voltages based on the one or more currents. The control unit 706 may be configured to calculate one or more back electromotive force voltages further based on the and one or more motor (terminal) voltages or DC-Link voltage.

The control unit 706 may be further configured to modify or adjust the exciting voltages based on the one or more back electromotive force voltages.

The control unit 706 may also be referred to as the commutations and speed control unit.

The inverter circuit 702 may include a voltage source 712 and a capacitor 714 coupled to the voltage source 712. The capacitor 714 may be coupled in parallel to the voltage source 712. The inverter circuit 702 may further include power electronics, i.e., switching devices, such as, transistors 716a, 716b, 716c, 716d, 716e, 716f. The inverter circuit may include MOSFETs or IGBTs. The inverter circuit 702 may also include anti-parallel freewheeling diodes 718a, 718b, 718c, 718d, 718e, 718f. Electronics switching device 716a may be coupled serially to switching device 716b, and the pair of switching devices 716a, 716b may be coupled in parallel to capacitor 714. Likewise, switching device 716c may be coupled serially to switching device 716d, and the pair of switching devices 716c, 716d may be coupled in parallel to capacitor 714; switching devices 716e may be coupled serially to switching devices 716f, and the pair of switching devices 716e, 716f may be coupled in parallel to capacitor 714. Diode 718a may be coupled in parallel to switching device 716a, anti-parallel freewheeling diode 718b may be coupled in parallel to switching devices 716b, diode 718c may be coupled in anti-parallel to switching device 716c, diode 718d may be coupled in anti-parallel to transistor 716d, diode 718e may be coupled in anti-parallel to switching device 716e, and diode 718f may be coupled in anti-parallel to transistor 716f. The gates e.g. gates of switching devices 716a, 716b, 716c, 716d, 716e, 716f may be coupled to control unit 706. As such, the control unit 706 may be configured to switch on and switch off switching devices-716a, 716b, 716c, 716d, 716e, 716f. The switching devices 716a, 716b, 716c, 716d, 716e, 716f may be metal oxide field effect transistors (MOSFETs). In various embodiments, the switching devices may be p-channel or n-channel MOSFETS. In various other embodiments, the transistors may be IGBTs.

Capacitor 714 may be charged by voltage source 712 (e.g. to $V_{DC}$). Drain terminals of each of switching devices 716a, 716c, 716e may be coupled to a positive terminal of capacitor 714 at $V_{Dc}$, 716c, 716e may be respectively coupled to drain terminals of switching devices 716b, 716d, 716f as well as to a respective coil of three coils 710a, 710b 710c of motor 710. The source terminals of each of switching devices 716b, 716d, 716f may be coupled to a negative terminal of capacitor 714 , referred as ground. Each of freewheeling diodes 718a, 718b, 718c, 718d, 718e, 718f may provide a current path from a motor winding to charge the capacitor if the switching devices which the respective diode is coupled in anti-parallel to a switching device which is switched off . . . . The control unit 706 may be further configured to modify or adjust the exciting voltages through the gate control signal of switching devices, $S_{AH}$, $S_{AL}$, $S_{BH}$, $S_{BL}$, $S_{CH}$, $S_{CL}$. These signals $S_{AH}$, $S_{AL}$, $S_{BH}$, $S_{BL}$, $S_{CH}$, $S_{CL}$ controls the switching-on or switching off of switching devices 716a, 716b, 716c, 716d, 716e, 716f. When any one or two switching devices 716a, 716c, 716e are activated, $V_{DC}$ may be transmitted to the respective coil coupled to the switching-on device if any two or one of 716b, 716d, 716f are switched on too). When any one switching device of 716a, 716c, 716e is deactivated or switched off, the current of the corresponding phase may be transmitted returned to the capacitor 714 or/and power supply 712 through the lower arm anti-parallel diode or sychrnouse control MOSFET. For instance, if switching device 716a is switched "On" and switching device 716d or 716f is "On" too, $V_{DC}$ may be applied to coil 710a and 710b or 710c. If switching device 716a is deactivated or switched-off and switching device 716c or 716e is switched on or activated, to the current from coil 710a will return to the capacitor 714 or/and power supply 712 through the anti-parallel diode of switching device 716b until the current becomes zero. The source terminal of switching devices 716a. The hardware may prevent the upper arm and lower arm devices of the same phase to activate at the same. It will damage the inverter with a short-through current. By controlling each switching device, i.e. 716a and 716b or 716c and 716d or 716e and 716f, varying exciting voltage of the width modification, i.e., pulse-width modification (PWM), may be transmitted to the respective coil coupled. Sinusoidal exciting voltages may be generated by the inverter circuit 702, the control unit 706 and voltage and current detection circuit 704.

Figure 4B:
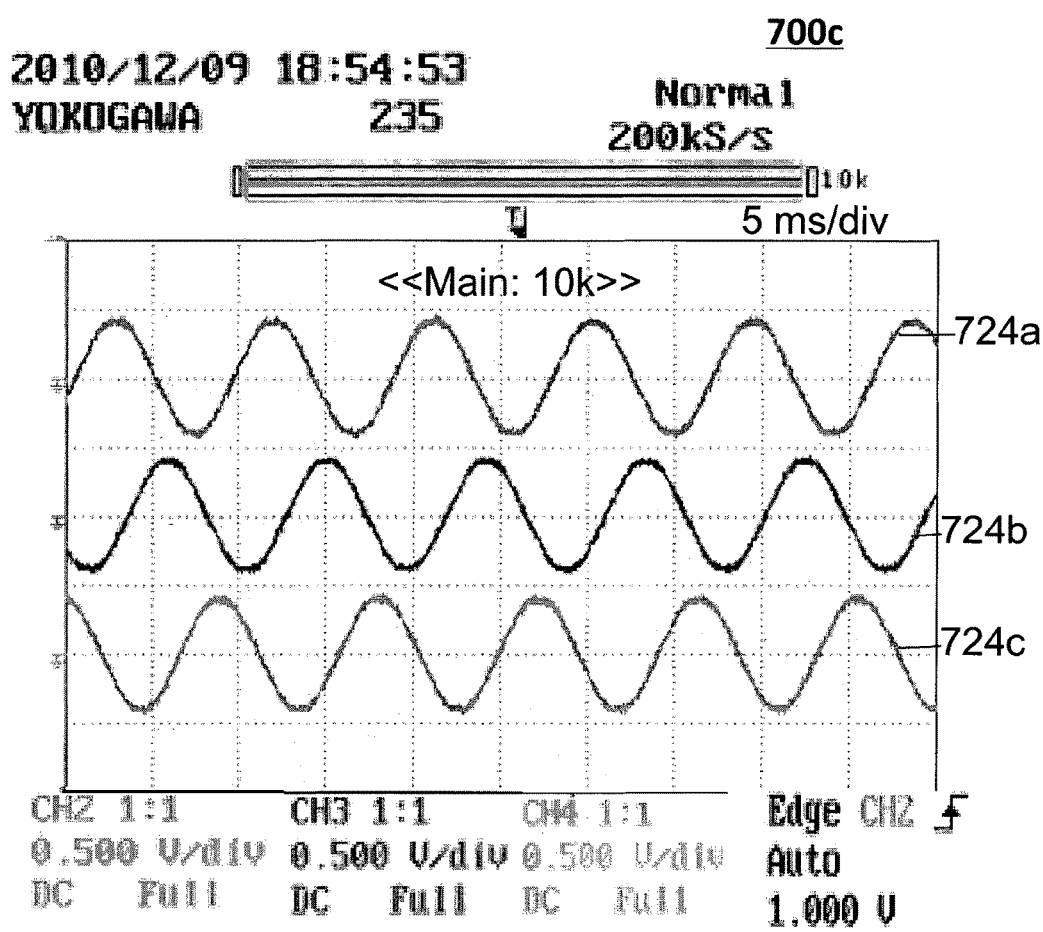
FIG. 4B is a plot of current against time showing currents generated at motor according to various embodiments.

FIG. 4B is a plot 700c of current against time showing currents 724a, 724b, 724c generated at motor 710 according to various embodiments. Current 724a may be generated at coil 710a, current 724b may be generated at coil 710b and current 724c may be generated at coil 710c.

Figure 5A:
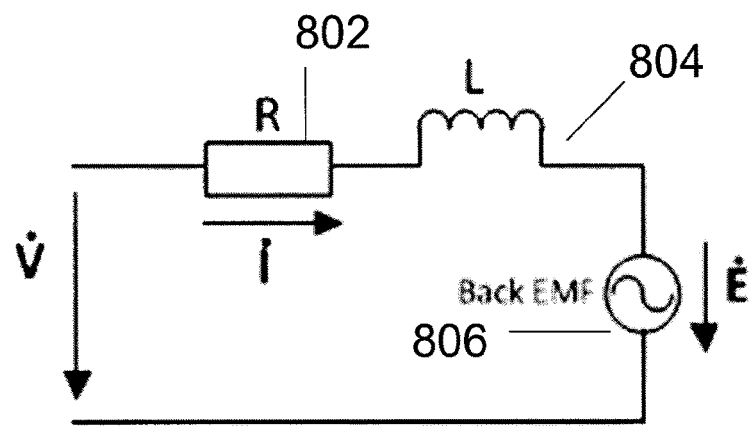
FIG. 5A is a schematic representing an equivalent circuit of a motor such as an axial field motor or surface-mounted permanent magnetic motor according to various embodiments.
Figure 5B:
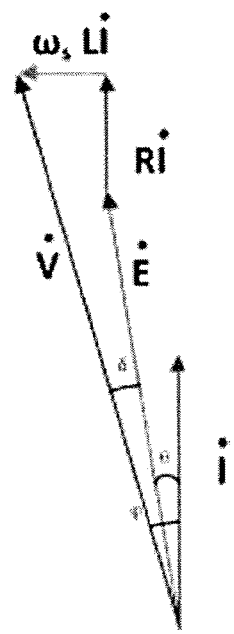
FIG. 5B is a schematic of a vector diagram according to various embodiments.

The motor steady operation may be described by the following two equations:

$$\dot{V} = R\dot{I} + L\frac{d\dot{I}}{dt} + \dot{E} \quad (3)$$

$$T_{em} = \frac{3p_p \times I \times E}{2\omega_r}\cos\theta \quad (4)$$

where R is the phase resistance, L is the phase inductance, V, I and E are the amplitudes of the phase voltage vector $\dot{V}$, current vector $\dot{I}$ and back EMF vector $\dot{E}$, $T_{em}$ is electromagnetic torque and the angle θ is the phase difference between the current vector and back EMF vector, $p_p$ means magnet pole-pairs of North and South poles. FIG. 5A is a schematic 800a representing an equivalent circuit of a motor such as an axial field motor or surface-mounted permanent magnetic motor according to various embodiments. FIG. 5A may represent Equation (3). 802 may represent a resistor with resistance R, 804 may represent an inductor with inductance L and 806 may represent a back EMF component with back EMF vector $\dot{E}$. Phase voltages may include potential differences across the resistor and the inductor as well as BEMF. Phase voltages may be $V_{An}$, $V_B$, $V_{Cn}$ as shown in FIG. 3E. FIG. 5B is a schematic 800b of a vector diagram according to various embodiments. The vector diagram may also represent Equation (3). FIGS. 5A and 5B may represent steady operations of the motor.

Figure 6A:
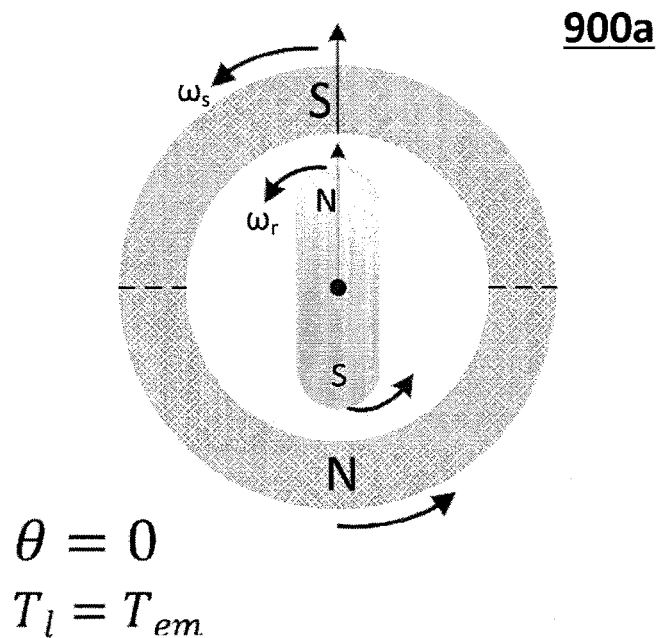
FIG. 6A is a schematic showing the motor when the phase difference between the current vector and back EMF vector is substantially zero according to various embodiments.
Figure 6B:
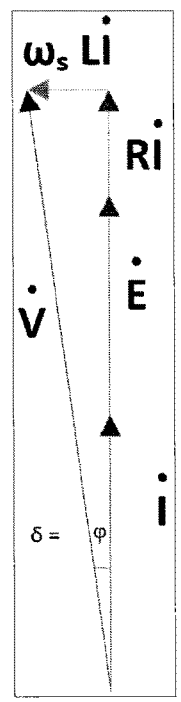
FIG. 6B is a schematic of a vector diagram of the motor shown in FIG. 6A according to various embodiments.
Figure 9A:
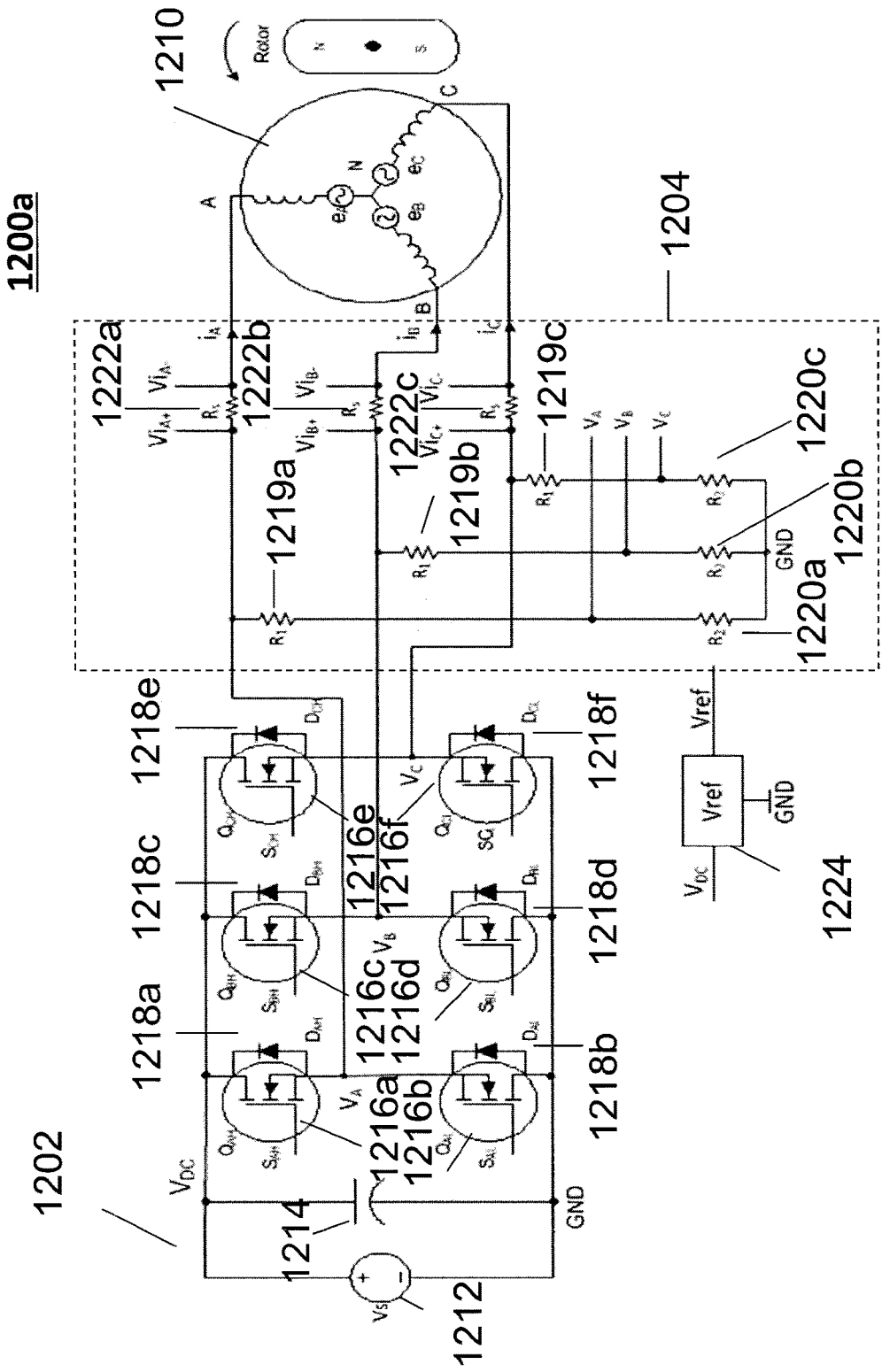
FIG. 9A is a schematic of a motor control system for controlling a motor, the motor control system including voltage and current detection circuits according to various embodiments.
Figure 9B:
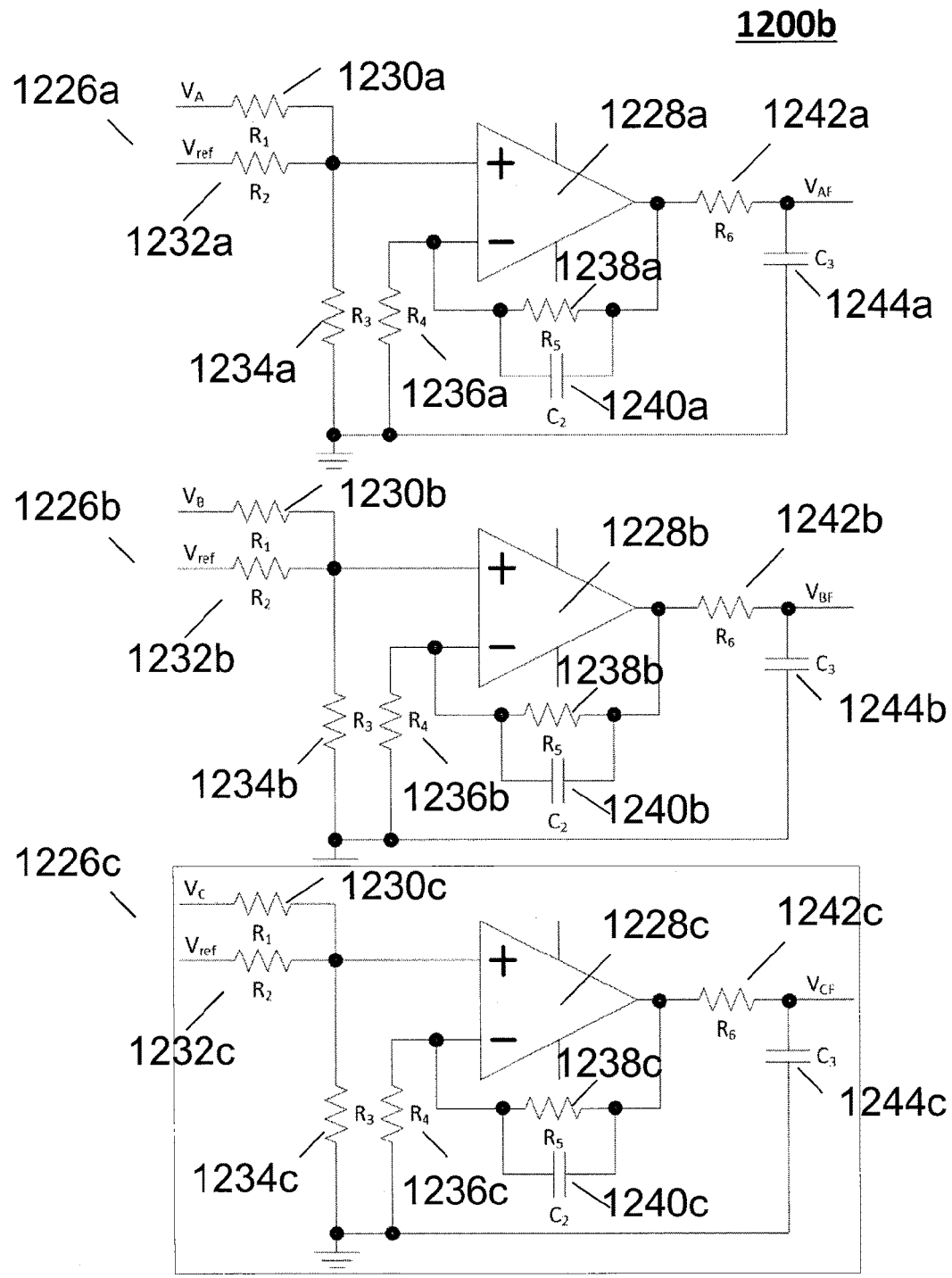
FIG. 9B is a schematic of voltage low pass filters according to various embodiments.

FIG. 6A is a schematic 900a showing the motor when the phase difference between the current vector and back EMF vector is substantially zero according to various embodiments. FIG. 6B is a schematic 900b of a vector diagram of the motor shown in FIG. 6A according to various embodiments. When the phase difference θ is substantially equal to zero, as shown in FIGS. 9A-B, the exciting current may be the smallest as the back EMF vector is kept as the same phase of the current at the synchronous speed.

Figure 6C:
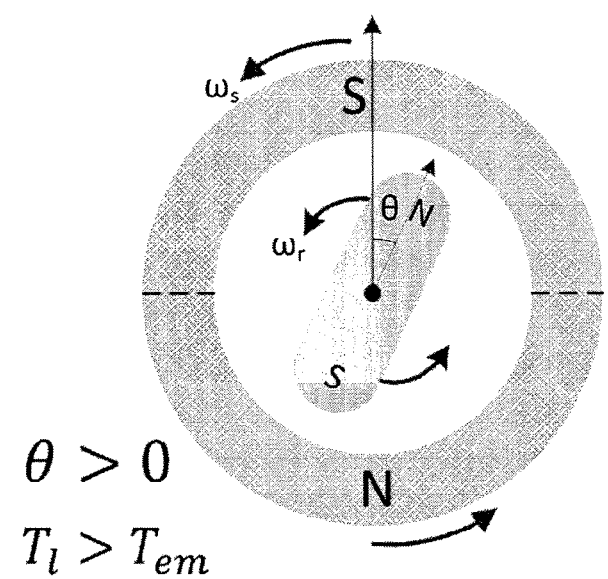
FIG. 6C is a schematic showing the motor when the phase difference between the current vector and back EMF vectors is positive according to various embodiments.
Figure 6D:
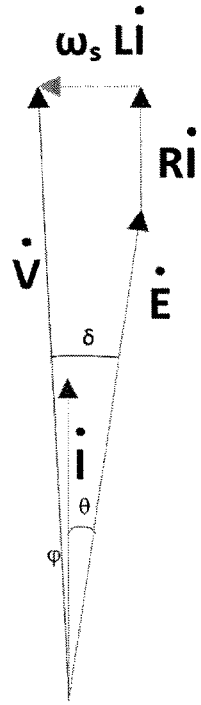
FIG. 6D is a schematic of a vector diagram of the motor shown in FIG. 6C according to various embodiments.

FIG. 6C is a schematic 900c showing the motor when the phase difference between the current vector and back EMF vectors is positive according to various embodiments. FIG. 6D is a schematic 900d of a vector diagram of the motor shown in FIG. 6C according to various embodiments. When the difference angle θ is positive, i.e., current vector leads the back EMF vector, as shown in FIGS. 6C-D, bigger amplitude phase voltage may be applied. In such a case, physical meaning is that the rotor magnet field may be behind or slower than the magnet field generated by phase exciting currents. Bigger currents may generate a stronger torque to pull the rotor to follow exciting magnetic field, i.e., synchronously rotating with exciting current speed.

Figure 6E:
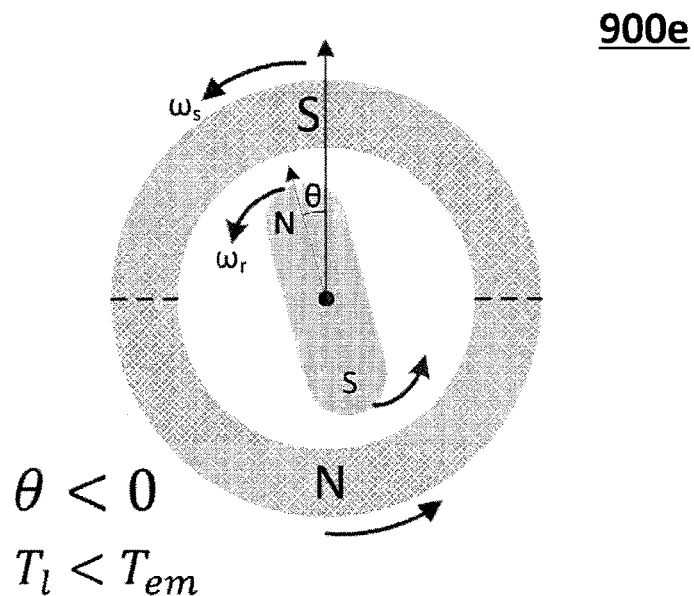
FIG. 6E is a schematic showing the motor when the phase difference between the current vector and back EMF vectors is negative according to various embodiments.
Figure 6F:
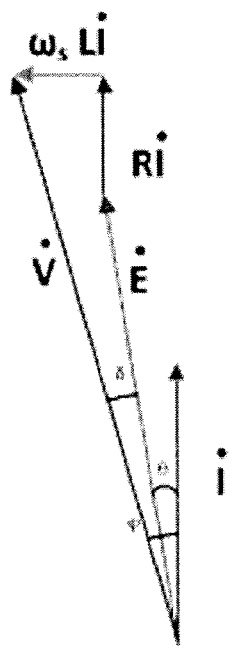
FIG. 6F is a schematic of a vector diagram of the motor shown in FIG. 6E according to various embodiments.

FIG. 6E is a schematic 900e showing the motor when the phase difference between the current vector and back EMF vectors is negative according to various embodiments. FIG. 6F is a schematic 900f of a vector diagram of the motor shown in FIG. 6E according to various embodiments. When the phase difference θ is negative, i.e., current vector lags to the back EMF vector angle, as shown in FIGS. 6E-F, smaller amplitude phase voltage may be applied. Its physical meaning is that the rotor magnet field may be in front of or faster than the magnet field of phase exciting currents. Smaller currents may generate a smaller torque to slow the rotor to synchronously rotate with exciting current speed.

The exciting voltage required may be described by equations (5) and (6)

$$V(t) = V_{min} \times K_p \times \theta(t) K_I \int_0^t \theta(\tau) d\tau \quad (5)$$

$$V_{min} = E_{rated} + I_o \sqrt{R^2 + (\omega_s L_e)^2} \quad (6)$$

where $L_e$ is the inductance of the coil in the motor, R is the resistance, angle θ is the phase difference between the current vector and back EMF vectors, $I_o$ is the maximum current, $\omega_s$ is the angular frequency at the stator. Kp and $K_I$ are gains of a PI close-loop control according to the phase difference and $E_{rated}$ means the rated amplitude of phase BEMF when the motor runs at the constant speed.

In order for the motor to run at the synchronous speed, i.e. ($\omega_r = \omega_s$), voltage exciting frequency may be fixed. Only the applied voltage amplitide may be adjusted to control the phase difference between the current vector and back EMF vector to be substantially zero, i.e. θ=0° or θ~0° (e.g. θ<|8°|). Proportional intergral (PI) and/or sliding mode control may be suitable to realize closed-loop speed control.

When the load changes, the motor may have to run in a transient state and the difference angle θ between the current vector and back EMF vector changes correspondingly. In order to keep the dynamic stability of the motor operation, the control of applied voltage amplitude may have to be adjusted dynamically by following variations of the load torque and the phase difference angle θ. Therefore, Clarke transformation may be applied to three phase currents and back EMFs. According to Forward Clarke Transformation, the transient phase angles of the current vector and back EMF vector are:

$$\theta_I = \tan^{-1} \frac{\sqrt{3}\, i_A(t)}{i_B(t) - i_C(t)} \quad (7)$$

$$\theta_E = \tan^{-1} \frac{\sqrt{3}\, e_A(t)}{e_B(t) - e_C(t)}$$

$$\theta = \theta_I - \theta_E \quad (8)$$

$\theta_I$ is the current vector angle, $\theta_E$ is the back EMF vector angle, θ is the phase difference between the current vector and back EMF vectors, $i_A$, $i_B$, $i_C$ are the phase currents and $e_A$, $e_B$ and $e_C$ are the phase back EMFs.

The three phase currents $i_A$, $i_B$, $i_C$ may be directly measured, e.g. through the sampling resistances or other current sensors, such as Hall current sensors. However, the phase back EMFs $e_A$, $e_B$ and $e_C$ may not be directly measured.

Based on the mathematic model of electrical machines, the relationships between the applied phase voltages, the exciting phase currents and the induced back EMFs may be provided by $$\begin{bmatrix} V_{An} \\ V_{Bn} \\ V_{Cn} \end{bmatrix} = \begin{bmatrix} e_A \\ e_B \\ e_C \end{bmatrix} + \begin{bmatrix} R_A & & \\ & R_B & \\ & & R_C \end{bmatrix} \begin{bmatrix} i_A \\ i_B \\ i_C \end{bmatrix} + \begin{bmatrix} L_{AA} & M_{AB} & M_{AC} \\ M_{AB} & L_{BB} & M_{BC} \\ M_{AC} & M_{BC} & L_{CC} \end{bmatrix} \frac{d}{dt} \begin{bmatrix} i_A \\ i_B \\ i_C \end{bmatrix} \quad (9)$$

where $V_{An}$, $V_{Bn}$ and $V_{Cn}$ are phase voltages, $i_A$, $i_B$ and $i_C$ are phase currents, $e_A$, $e_B$, $e_C$ are phase back EMFs, $R_A$, $R_B$, $R_C$ are phase resistance, $L_{AA}$, $L_{BB}$ and $L_{CC}$ are phase self-inductance and $M_{AB}$, $M_{BC}$, $M_{CA}$ are the mutual inductance between each two phases.

Phase voltages $V_{An}$, $V_{Bn}$, and $V_{Cn}$ may be measured from the motor control system. Phase currents $i_A$, $i_B$ and $i_C$ may also be measured from the motor control system. The phase back EMFs may be calculated based on the phase voltages and currents as well as the motor parameters of the inductances and resistances.

For a phase symmetry motor, the three phase resistances, self-inductances and mutual inductance may be assumed to be equal for each phase. In particular, for axial field (AF) and surface-mounted PM motors, the self and mutual inductances may be independent on the rotor position. Therefore, the followings equations are expected:

$$R = R_A = R_B = R_C \quad (10)$$

$$L = L_{AA} = L_{BB} = L_{CC} = l_s + L_{sM} \quad (11)$$

$$M = M_{AB} = M_{BC} = M_{CA} = L_{sM} \cos(120°) = -1/2 L_{sM} \quad (12)$$

$$L_e L - M = l_s + 3/2 L_{sM} \quad (13)$$

$L_{sM}$ is main-magnetic field inductance of motor phase winding inductance which magnetic field go through air-gap between the stator and rotor and reach at the rotor yoke while $l_s$ is leakage inductance of motor winding inductance which magnetic field only goes around the stator and does not couple to the phase windings. $L_e$ is the equivalent inductance to simplify the mode equations.

The sum of of motor three phase currents is zero, i.e., $$i_A + i_B = i_C = 0 \quad (14)$$

The back EMFs from equation (9) may be provided by:

$$e_A = V_{An} - R i_A - L_e \frac{di_A}{dt} \quad (15)$$

$$e_B = V_{Bn} - R i_B - L_e \frac{di_B}{dt}$$

$$e_C = V_{Cn} - R i_C - L_e \frac{di_C}{dt}$$

Also, the sum of phase back EMFs is zero $$e_A + e_B + e_C = 0 \quad (16)$$

The phase difference angle θ may be calculated based on equations (7)-(16). Substituting equations (15) and (16) into equation (7):

$$\theta_I = \tan^{-1} \frac{\sqrt{3}\, i_A(t)}{2 i_B(t) - i_A(t)} \quad (17)$$

$$\theta_E = \tan^{-1} \frac{\sqrt{3}\, e_A(t)}{2 e_B(t) - e_A(t)}$$

From equation (9), $$e_A(\theta) = k_e \omega_r \sin(\theta)$$

$$e_B(\theta) = e_A(\theta - 2/3\pi) = k_e \omega_r \sin(\theta - 2/3\pi)$$

$$e_C(\theta) = e_A(\theta - 4/3\pi) = k_e \omega_r \sin(\theta - 4/3\pi) \quad (18)$$

$k_e$ is back EMF constant with the unit of V/rad/s.
From Equation (4), $$T_{em} = \frac{p_p}{\omega_r}(e_A \times i_A + e_B \times i_B + e_C \times i_C) \quad (19)$$

$$\frac{J}{p_p}\frac{d\omega_r}{dt} = T_{em}(t) + T_{cogging} - T_f(t) - T_{load}(t) \quad (20)$$

$$\text{where } \omega_r = \frac{d\theta}{dt}, \quad (21)$$

$$n = \frac{60\omega_r}{2\pi p_p} \text{ and } \theta_m = \frac{\theta}{p_p} \quad (22)$$

J is rotating system inertia of a motor and load subsystem, $T_{cogging}$ is the cogging torque caused by the slots of the stator, $T_f$ is the mechanical friction torque of the bearing, windage and iron core loss (if applicable). $T_{load}$ is the load torque and n here means revolutions per minute (rpm).
Also, $$T_{em} = 3 p_p \times k_e \times I \cos\theta \quad (23)$$

Figure 7:
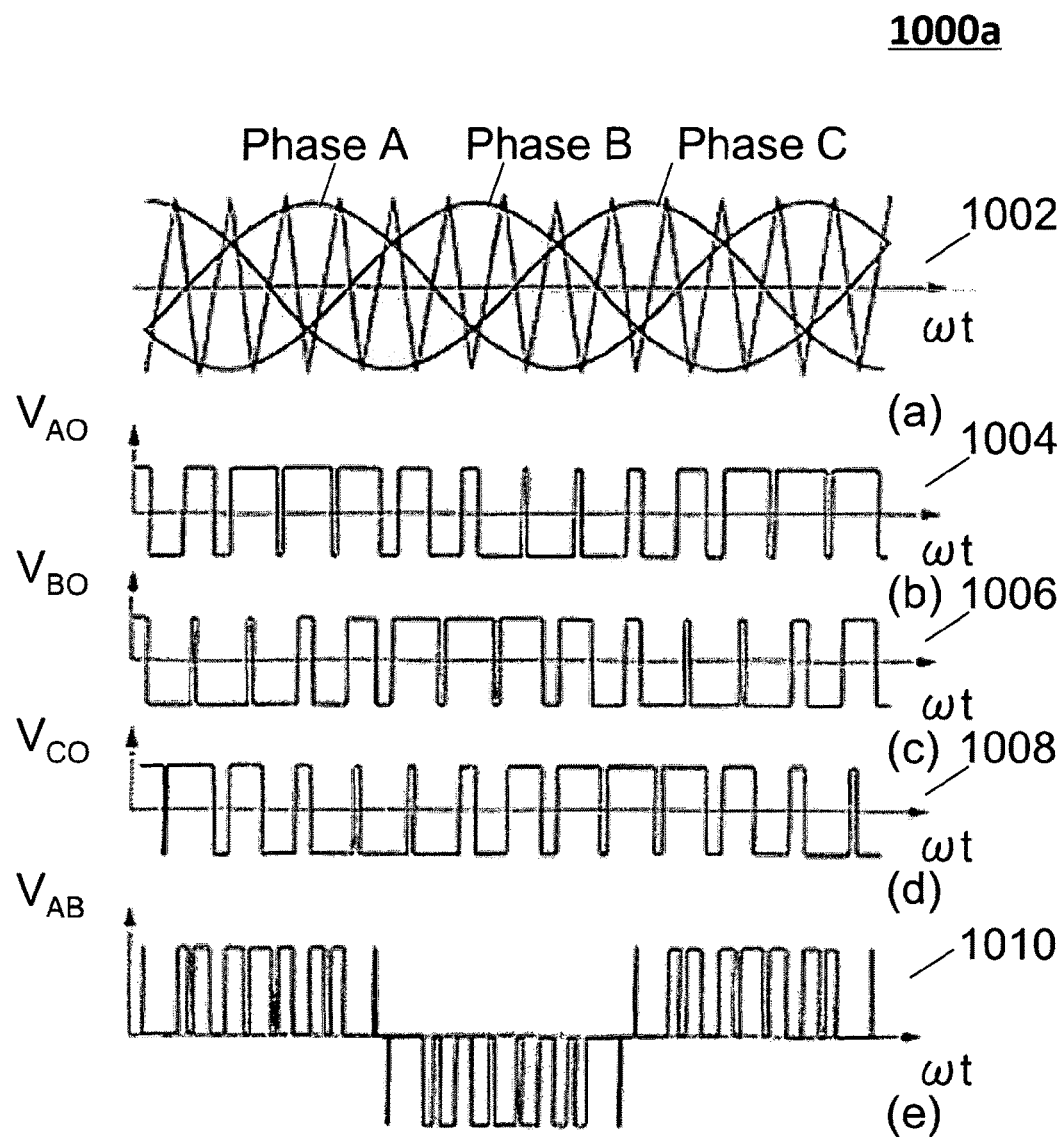
FIG. 7 is an illustration showing principle of pulse width modification (PWM) exciting voltages.

FIG. 7 is an illustration 1000a showing principle of sinusoidal PWM exciting voltages. 1002 shows the required phase voltages with the PWM triangle carrier while 1004, 1006, and 1008 shows the variation of voltages applied at the motor terminals relative to the inverter ground. 1010 represents one line voltage or the difference voltage of phase A and phase B voltages. FIG. 7 illustrates generating sinusoidal PWM voltages.

If sinusoidal PWM voltages are applied to the motor as shown in FIG. 7, low pass filters may have to be applied to the voltage and current channels.

Figure 8:
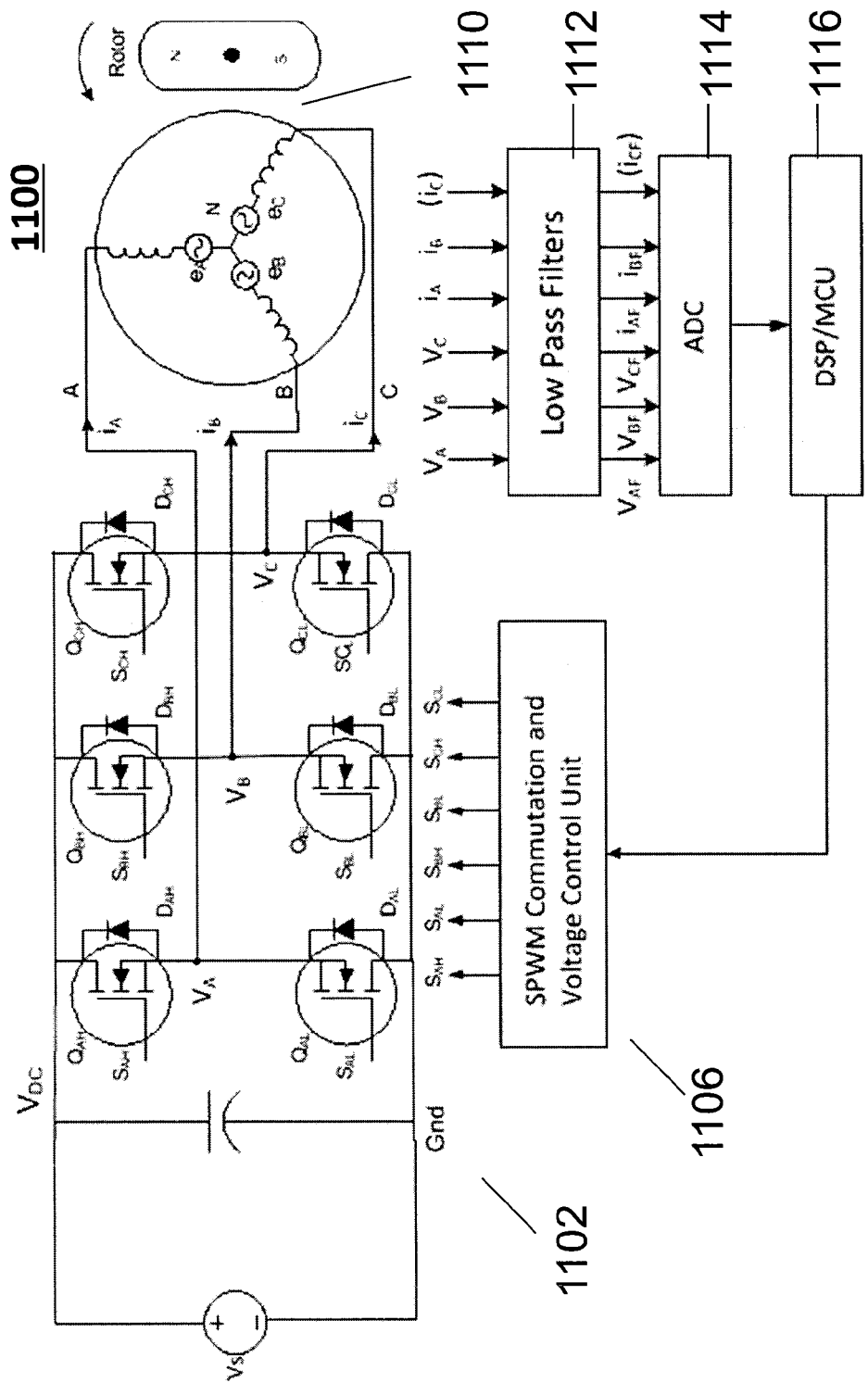
FIG. 8 is a schematic of a motor control system for controlling a motor according to various embodiments.

FIG. 8 is a schematic 1100 of a motor control system for controlling a motor 1110 according to various embodiments. The motor control system may include an inverter circuit 1102 configured to apply exciting voltages to the motor 1110. The motor control system may further include a voltage and current detection circuit coupled with the inverter circuit 1102. The detection circuit may be configured to measure one or more currents (e.g. $i_A$, $i_B$) from the motor 1110. A further current (e.g. $i_C$) may not be measured by may be calculated from the measured currents (e.g. $i_A$, $i_B$). Measuring $i_c$ may have less aero which ic is close to zero. In practices, both circuits may work, but circuit in which $i_c$ is measured may have a better detection of current $i_c$ with a higher cost. The detection circuit may be further configured to measure current sensing(or sampling) resistance voltages or motor voltages (e.g. $V_A$, $V_B$, $V_C$) from the motor 1110. The motor control system may also include a control unit 1106 coupled with the inverter circuit 1102 and the voltage or/and current detection circuit. The control unit 1106 may be configured to calculate one or more back electromotive force voltages based on the one or more currents (and further current). The control unit 1106 may be configured to calculate one or more back electromotive force voltages further based on the current sensing resistance voltages or motor voltages. The control unit 1106 may be further configured to modify or adjust the exciting voltages based on the one or more back electromotive force voltages. Motor voltages $V_A$, $V_B$, $V_C$ may refer to the respective potential difference at coils A, B, C measured relative to ground.

The motor control system may further include one or more filters 1112. The one or more filters may include one or more current detection low pass filters and/or one or more voltage low pass filters. The one or more voltage low pass filters may be configured to generate a filtered DC-link voltage signal based on the DC-link voltage. The one or more voltage low pass filters may additionally or alternatively be configured to generate one or more filtered motor voltage signals based on the one or more motor voltages. The voltage low pass filters may be configured to filter each of the motor voltages (e.g. $V_A$, $V_B$, $V_C$) to generate one or more filtered motor voltage signals (e.g. $V_{AF}$, $V_{BF}$, $V_{CF}$). Filtered motor voltage signal $V_{AF}$ may be generated from motor voltage signal $V_A$, filtered motor voltage signal $V_{BF}$ may be generated from motor voltage signal $V_B$ and filtered voltage signal $V_{CF}$ may be generated from motor voltage signal $V_C$. The current detection low pass filter may be configured to filter each of the one or more currents (and further current) to generate one or more filtered current signals (e.g. $i_{AF}$, $i_{BF}$, $i_{CF}$). For instance, filtered current $i_{AF}$ may be generated based on measured current $i_A$, filtered current $i_{BF}$ may be generated based on measured current $i_B$ and filtered current $i_{CF}$ may be generated based on calculated current $i_C$. In various embodiments the filtered current $i_{CF}$ may be calculated based on $i_{AF}$ and $i_{BF}$.

The motor control system may further include an analog to digital converter circuit 1114 coupled to the one or more filters 1112. The motor control system may also include a signal processing circuit 1116 such as a digital signal processing or microcontroller unit coupled to the ADC circuit 1114. The signal processing circuit may further be coupled to the control unit 1106.

FIG. 9A is a schematic 1200a of a motor control system for controlling a motor 1210 according to various embodiments. The motor control system may include an inverter circuit 1202 configured to apply exciting voltages to the motor 1210. The motor control system may further include a detection circuit 1204 coupled with the inverter circuit 1202. The detection circuit 1204 may be configured to measure one or more currents from the motor 1210. The detection circuit 1204 may be further configured to measure motor voltages from the motor 1210.

The inverter circuit 1202 may include a voltage source 1212 and a capacitor 1214 coupled to the voltage source 1212. The capacitor 1214 may be coupled in parallel to the voltage source 1212. The inverter circuit 1202 may further include power electronics, i.e., switching devices, such as, transistors 1216a, 1216b, 1216c, 1216d, 1216e, 1216f. The inverter circuit may include MOSFETs or IGBTs. The inverter circuit 1202 may also include anti-parallel freewheeling diodes 1218a, 1218b, 1218c, 1218d, 1218e, 1218f. Electronics switching device 1218a may be coupled serially to switching device 1216b, and the pair of switching devices 1216a, 1216b may be coupled in parallel to capacitor 1214. Likewise, switching device 1216c may be coupled serially to switching device 1216d, and the pair of switching devices 1216c, 1216d may be coupled in parallel to capacitor 1214; switching devices 1216e may be coupled serially to switching devices 1216f, and the pair of switching devices 1216e, 1216f may be coupled in parallel to capacitor 1214. Diode 1218a may be coupled in parallel to switching device 1216a, anti-parallel freewheeling diode 1218b may be coupled in parallel to switching devices 1216b, diode 1218c may be coupled in anti-parallel to switching device 1216c, diode 1218d may be coupled in anti-parallel to transistor 1216d, diode 1218e may be coupled in anti-parallel to switching device 1216e, and diode 1218f may be coupled in anti-parallel to transistor 1216f.

The detection circuit 1204 may additionally be coupled to the motor 1210. The detection circuit 1204 may include a plurality of voltage dividers circuits for measuring a plurality of motor voltages. Each voltage divider may be coupled to the inverter 1202. Each voltage divider may include a first resistor 1219a, 1219b or 1219c (of value $R_1$) and a second resistor 1220a, 1220b or 1220c (of value $R_2$). Each voltage divder may be coupled to the control circuit 1202 at a first end (e.g. end nearer to the first resistor 1219a, 1219b or 1219c than second resistor 1220a, 1220b or 1220c) Each voltage divider may be coupled to ground (denoted by GND) at a second end (e.g. end nearer to the second resistor 1220a, 1220b or 1220c than the first resistor 1219a, 1219b or 1219c). Voltages $V_A$, $V_B$, $V_C$ may be sampled or measured at the junction between the first resistor 1219a, 1219b or 1219c and the second resistor 1220a, 1220b or 1220c. The motor voltages $V_A$, $V_B$, $V_C$ measured may not be equal but may be proportional to the exciting voltages applied to the motor 1210.

In other words, a first end of resistor 1219a may be coupled to the inverter 1202 (e.g. between transistors 1216a and 1216b). The second end of resistor 1219a may be coupled to the first end of resistor 1220a. The second end of resistor 1220a may be coupled to ground. Voltage $V_A$ may be measured at second end of resistor 1219a or first end of resistor 1220a.

Further, a first end of resistor 1219b may be coupled to the inverter 1202 (e.g. between switching devices 1216c and 1216d). The second end of resistor 1219b may be coupled to to the first end of resistor 1220b. The second end of resistor 1220b may be coupled to ground. Voltage $V_B$ may be measured at the second end of resistor 1219b or the first end of resistor 1220b.

Also, a first end of resistor 1219c may be coupled to the inverter 1202 (e.g. between switching devices 1216e and 1216f). The second end of resistor 1219c may be coupled to to the first end of resistor 1220c. The second end of resistor 1220c may be coupled to ground. Voltage $V_C$ may be measured at second end of resistor 1219c or first end of resistor 1220c.

The detection circuit 1204 may include resistors 1222a, 1222b, 1222c. Each of resistor 1222a, 1222b, 1222c (of value Rs) may be coupled between the inverter circuit 1202 and the motor 1210. Resistor 1222a may be coupled at one end to between switching devices 1216a and 1216b, resistor 1222b may be coupled at one end to between switching devices 1216c and 1216d, and resistor 1222c may be coupled at one end to between switching devices 1216e and 1216f. The other ends of resistors 1722a, 1722b, 1722c may be coupled to motor 1710. Voltages $Vi_{A+}$, $Vi_{A-}$ may be measured from two ends of resistor 1222a, voltages $Vi_{B+}$, $Vi_{B-}$ may be measured from two ends of resistor 1222b and voltages $Vi_{C+}$, $Vi_{C-}$ may be measured from two ends of resistor 1222c. Current flowing through resistor 1222a may be determined based on the voltages $Vi_{A+}$, $Vi_{A-}$. Similarly, current flowing though 1222b may be determined based on voltages $Vi_{B+}$, $Vi_{B-}$ and current flowing though 1222c may be determined based on voltages $Vi_{C+}$, $Vi_{C-}$.

The motor control system may further include a reference voltage generation circuit 1224 for generating a reference voltage $V_{ref}$ to compensate the voltage drops on the anti-parallel diodes of each switching device, which cause the motor terminal voltage to be negative, or less or lower than the ground voltage level zero. The reference voltage generation circuit 1224 may generate the reference voltage based on $V_{DC}$ and ground voltage (GND).

FIG. 9B is a schematic 1200b of voltage filters 1226a, 1226b, 1226c according to various embodiments. The voltage filters 1226a, 1226b, 1226c may be low pass filters. The voltage filters 1226a, 1226b, 1226c may be or may include non-inverting amplifier filter circuit. Each voltage filter 1226a, 1226b or 1226c may include an operational amplifier 1228a, 1228b or 1228c.

For instance, resistors 1230a, 1232a may be coupled to the non-inverting input of amplifier 1228a. The resistors 1230a, 1232a may be coupled to add the $V_A$ and $V_{ref}$ with a designed ratio so that the non-inverter input voltage of amplifier 1228a is kept to be positive always. Therefore, unipolar amplifier can be used to omit the negative power supply. The voltage $V_A$ as shown in FIG. 9A may be coupled to resistor 1230a while $V_{ref}$ from reference generation circuit 1224 may be coupled to resistor 1232a. A first end of resistor 1234a may be also coupled to the non-inverting input while the second end of resistor 1234a may be coupled to ground. A first end of resistor 1236a may be also coupled to the inverting input while the second end of resistor 1236a may be coupled to ground. Resistor 1238a may be coupled between output of amplifier 1228a and inverting input. Capacitor 1240a may be coupled in parallel to resistor 1238a to avoid the possible oscillation. Resistor 1242a may be coupled to output of amplifier 1228a at a first end of resistor 1242a and the filtered voltage $V_{AF}$ may be measured at a second end of resistor 1242a. Capacitor 1244a may be coupled between the second end of resistor 1242a and ground to form the low pass filter.

Similarly, resistors 1230b, 1232b may be coupled to the non-inverting input of amplifier 1228b. The resistors 1230b, 1232b may be coupled to add the $V_B$ and $V_{ref}$ with a designed ratio so that the non-inverter input voltage of amplifier 1228b is kept to be positive always. Therefore, unipolar amplifier can be used to omit the negative power supply. The voltage $V_B$ as shown in FIG. 9A may be coupled to resistor 1230b while $V_{ref}$ from reference generation circuit 1224 may be coupled to resistor 1232b. A first end of resistor 1234b may be also coupled to the non-inverting input while the second end of resistor 1234b may be coupled to ground. A first end of resistor 1236b may be also coupled to the inverting input while the second end of resistor 1236b may be coupled to ground. Resistor 1238b may be coupled between output of amplifier 1228b and inverting input. Capacitor 1240b may be coupled in parallel to resistor 1238b to avoid the possible oscillation. Resistor 1242b may be coupled to output of amplifier 1228b at a first end of resistor 1242b and the filtered voltage $V_{BF}$ may be measured at a second end of resistor 1242b. Capacitor 1244a may be coupled between the second end of resistor 1242b and ground to form the low pass filter.

Resistors 1230c, 1232c may be coupled to the non-inverting input of amplifier 1228c. The resistors 1230c, 1232c may be coupled to add the $V_c$ and $V_{ref}$ with a designed ratio so that the non-inverter input voltage of amplifier 1228c is kept to be positive always. Therefore, unipolar amplifier can be used to omit the negative power supply. The voltage $V_C$ as shown in FIG. 9A may be coupled to resistor 1230c while $V_{ref}$ from reference generation circuit 1224 may be coupled to resistor 1232c. A first end of resistor 1234c may be also coupled to the non-inverting input while the second end of resistor 1234c may be coupled to ground. A first end of resistor 1236c may be also coupled to the inverting input while the second end of resistor 1236c may be coupled to ground. Resistor 1238c may be coupled between output of amplifier 1228c and inverting input. Capacitor 1240c may be coupled in parallel to resistor 1238c to avoid the possible oscillation. Resistor 1242c may be coupled to output of amplifier 1228c at a first end of resistor 1242c and the filtered voltage $V_{CF}$ may be measured at a second end of resistor 1242c. Capacitor 1244c may be coupled between the second end of resistor 1242c and ground to form the low pass filter.

Figure 9C:
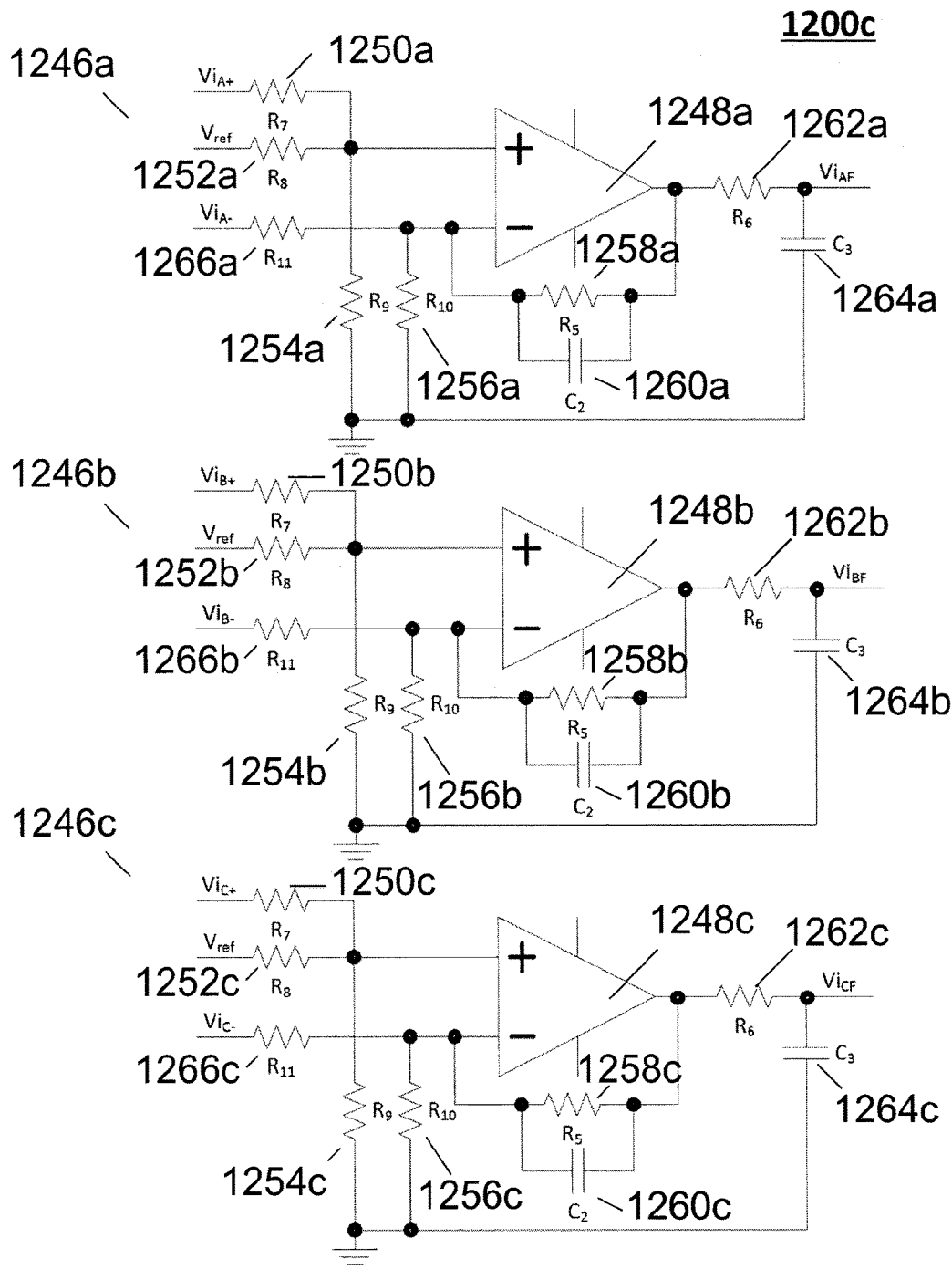
FIG. 9C is a schematic of current low pass filters according to various embodiments.

FIG. 9C is a schematic 1200c of current detection and current channel filters 1246a, 1246b, 1246c according to various embodiments. The current detection filters 1246a, 1246b, 1246c may be low pass filters. The current detection filters 1246a, 1246b, 1246c may be or may include non-inverting amplifier filter circuit. Each current detection filter 1246a, 1246b or 1246c may include an operational amplifier 1248a, 1248b or 1248c.

For instance, resistors 1250a, 1252a may be coupled to the non-inverting input of amplifier 1248a. The resistors 1250a, 1252a may be coupled in parallel. The voltage $Vi_{A+}$ as shown in FIG. 9A may be coupled to resistor 1250a while $V_{ref}$ from reference generation circuit 1224 may be coupled to resistor 1252a. A first end of resistor 1254a may be also coupled to the non-inverting input while the second end of resistor 1254a may be coupled to ground. A first end of resistor 1256a may be also coupled to the inverting input while the second end of resistor 1256a may be coupled to ground. Resistor 1266a may also be coupled to the inverting input. The voltage $Vi_{A-}$ as shown in FIG. 9A may be coupled to resistor 1266a. Resistor 1258a may be coupled between output of amplifier 1248a and inverting input. Capacitor 1260a may be coupled in parallel to resistor 1258a. Resistor 1262a may be coupled to output of amplifier 1248a at a first end of resistor 1262a and the filtered voltage $Vi_{AF}$ may be measured at a second end of resistor 1262a. Capacitor 1264a may be coupled between the second end of resistor 1262a and ground.

Similarly, resistors 1250b, 1252b may be coupled to the non-inverting input of amplifier 1248b. The resistors 1250b, 1252b may be coupled in parallel. The voltage $Vi_{B+}$ as shown in FIG. 9A may be coupled to resistor 1250b while $V_{ref}$ from reference generation circuit 1224 may be coupled to resistor 1252b. A first end of resistor 1254b may be also coupled to the non-inverting input while the second end of resistor 1254b may be coupled to ground. A first end of resistor 1256b may be also coupled to the inverting input while the second end of resistor 1256b may be coupled to ground. Resistor 1266b may also be coupled to the inverting input. The voltage $Vi_{B-}$ as shown in FIG. 9A may be coupled to resistor 1266b. Resistor 1258b may be coupled between output of amplifier 1248b and inverting input. Capacitor 1260b may be coupled in parallel to resistor 1258b. Resistor 1262b may be coupled to output of amplifier 1248b at a first end of resistor 1262b and the filtered voltage $Vi_{BF}$ may be measured at a second end of resistor 1262b. Capacitor 1264b may be coupled between the second end of resistor 1262b and ground.

Resistors 1250c, 1252c may be coupled to the non-inverting input of amplifier 1248c. The resistors 1250c, 1252c may be coupled in parallel. The voltage $Vi_{C+}$ as shown in FIG. 9A may be coupled to resistor 1250c while $V_{ref}$ from reference generation circuit 1224 may be coupled to resistor 1252c. A first end of resistor 1254c may be also coupled to the non-inverting input while the second end of resistor 1254c may be coupled to ground. A first end of resistor 1256c may be also coupled to the inverting input while the second end of resistor 1256c may be coupled to ground. Resistor 1266c may also be coupled to the inverting input. The voltage $Vi_{C-}$ as shown in FIG. 9A may be coupled to resistor 1266c. Resistor 1258c may be coupled between output of amplifier 1248c and inverting input. Capacitor 1260c may be coupled in parallel to resistor 1258c. Resistor 1262c may be coupled to output of amplifier 1248c at a first end of resistor 1262c and the filtered voltage $Vi_{CF}$ may be measured at a second end of resistor 1262c. Capacitor 1264c may be coupled between the second end of resistor 1262c and ground.

The filtered phase voltages may be expressed as:

$$V_{AnF} = \frac{2}{3}V_{AF} - \frac{1}{3(V_{BF} + V_{CF})} \qquad (24)$$

$$V_{BnF} = \frac{2}{3}V_{BF} - \frac{1}{3(V_{CF} + V_{AF})}$$

$$V_{CnF} = \frac{2}{3}V_{CF} - \frac{1}{3(V_{AF} + V_{BF})}$$

where $V_{AnF}$, $V_{BnF}$ and $V_{CnF}$ are filtered measured phase voltages.

The filtered phase currents may be expressed as $$i_{AF} = \frac{Vi_{AF}}{R_s} \qquad (25)$$

$$i_{BF} = \frac{Vi_{BF}}{R_s}$$

$$i_{CF} = \frac{Vi_{CF}}{R_s}$$

where $i_{AF}$, $i_{BF}$ and $i_{CF}$ represent the filtered currents flowing through resistors 1222a, 1222b and 1222c respectively.

By applying the filtered phase voltages and currents in Equations (24) and (25) to Equations (7), (8) and (15), the phase difference θ between the current vector and back EMF vector may be estimated. Since there is a derivative calculation on the phase current in Equation (15), another low pass filter may be applied to the phase difference angle θ. A closed-loop proportional integral (PI) control may be applied to adjust the voltage amplitude to the phase angle difference.

Figure 10:
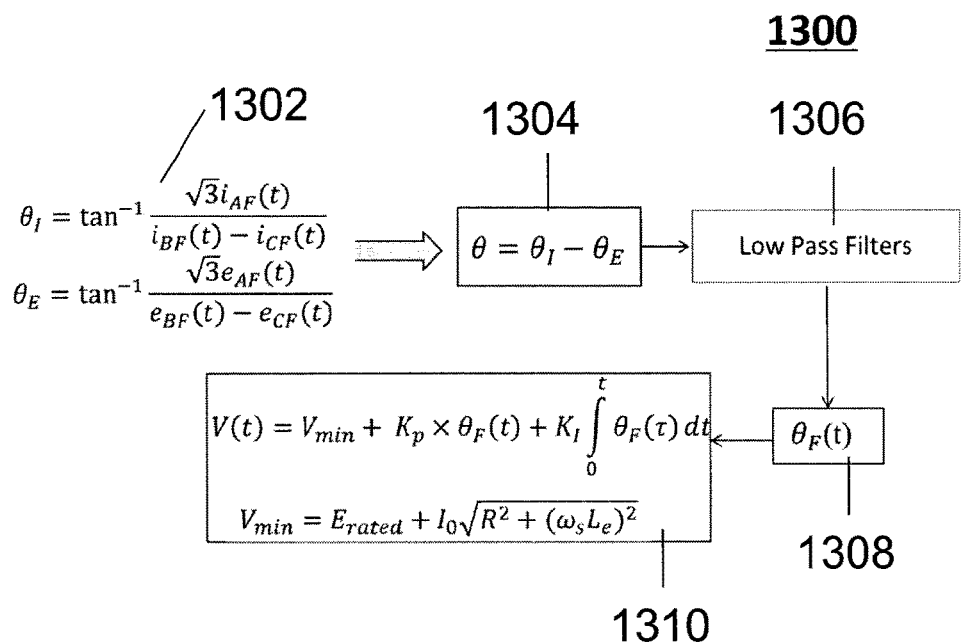
FIG. 10 is a schematic illustrating a method to control a motor according to various embodiments.

FIG. 10 is a schematic 1300 illustrating a method to control a motor according to various embodiments. The method may include, in 1302, calculating the current phase angle and back EMF phase angle. The method may also include, in 1304, calculating the phase difference based on the current phase angle and the back EMF phase angle. The method may additionally include, in 1306, filtering or applying a filter to the phase difference to obtain a filtered phase difference in 1308. The method may include, in 1310, adjusting the exciting voltage based on the filtered phase difference. As the phase difference may be kept substantially zero or close to zero, the motor may run at synchronous speed or the targeted speed.

Figure 11:
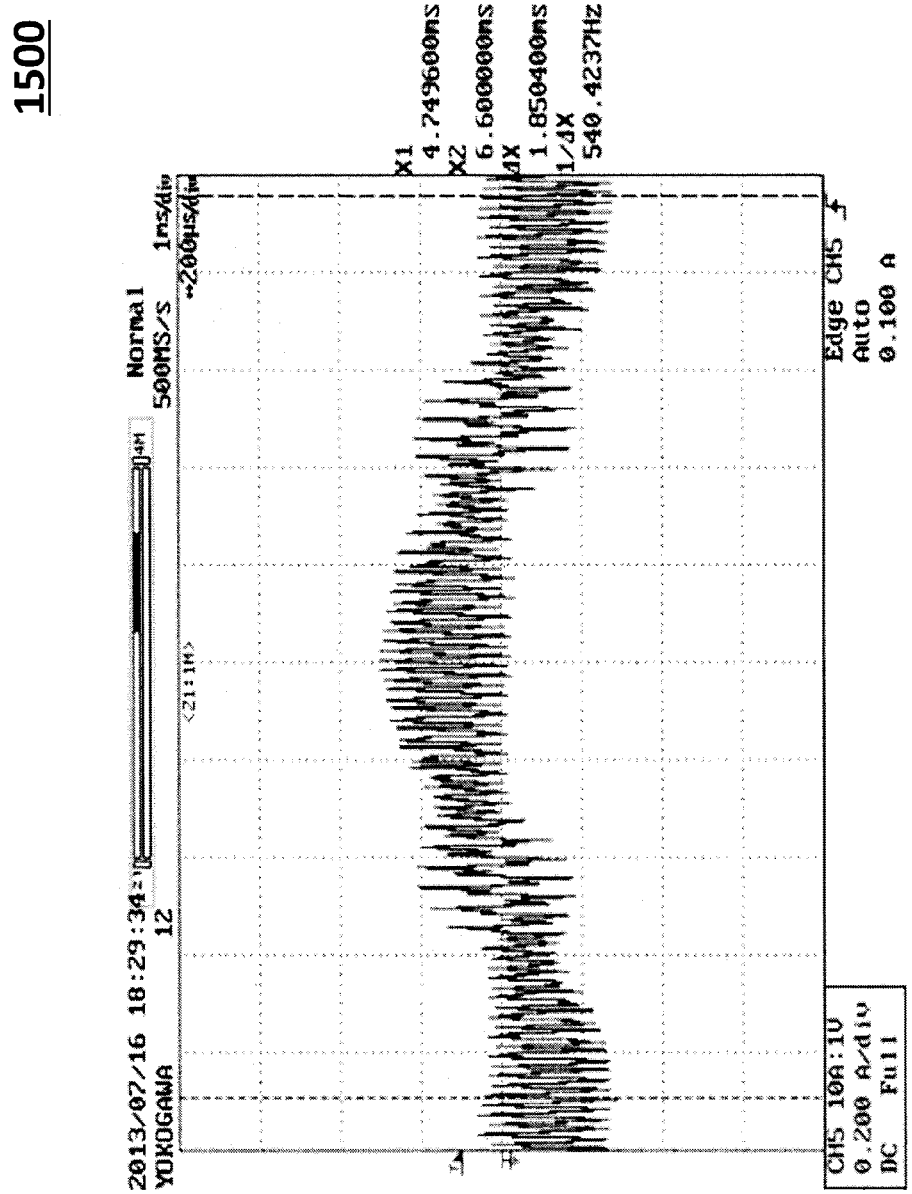
FIG. 11 is a plot of current against time showing a zoomed in portion of FIG. 10C.

FIG. 11 is a plot 1500 of current against time. FIG. 11 illustrates that the current may be minimized or reduced when the phase difference angle is substantially zero and the motor may run at the highest efficiency state.

Figure 12:
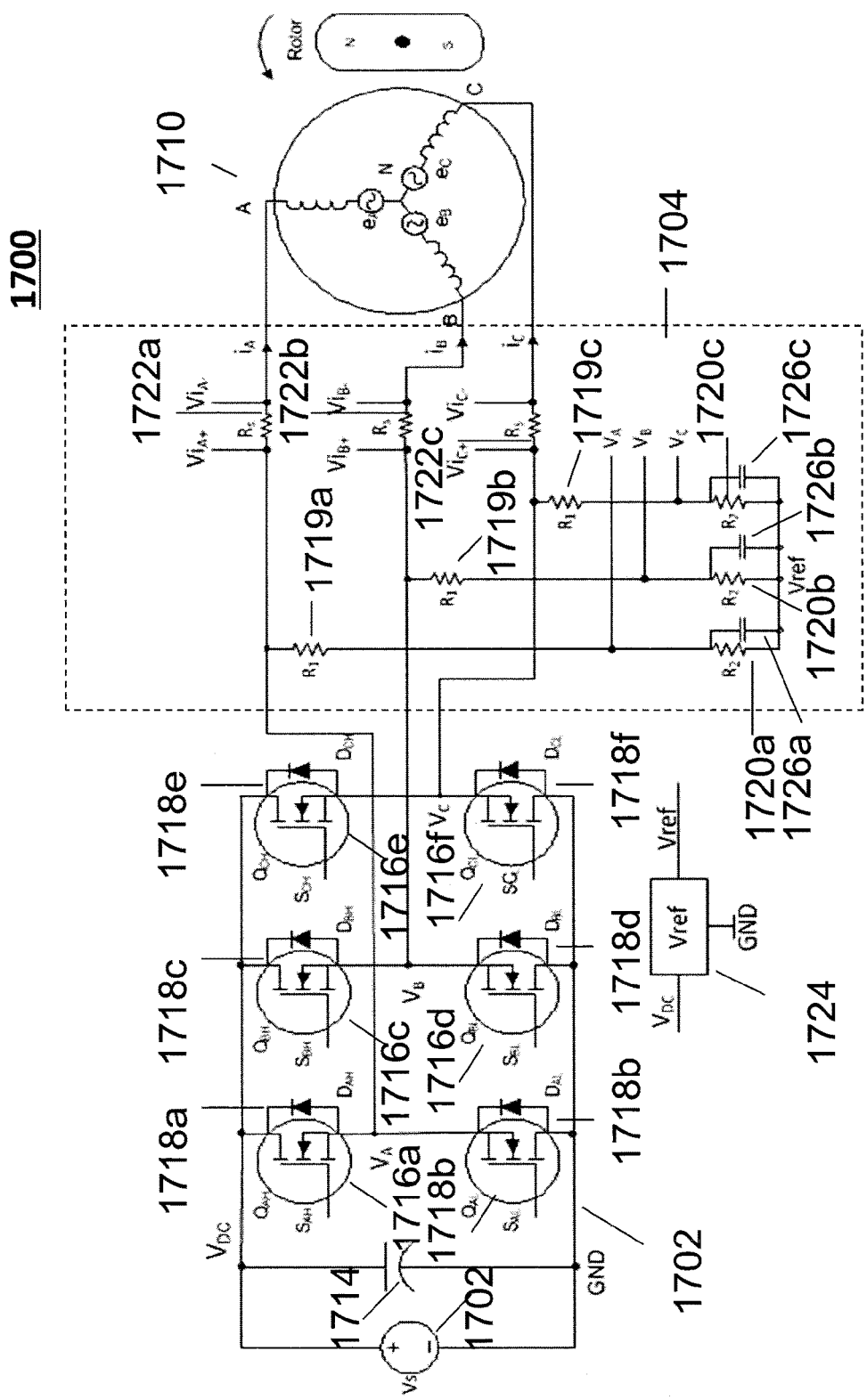
FIG. 12 is a schematic of a motor control system with voltage and current detection circuits for controlling a motor according to various embodiments.

FIG. 12 is a schematic 1700 of a motor control system for controlling a motor 1710 according to various embodiments. The motor control system may include a inverter circuit 1702 configured to apply exciting voltages to the motor 1710. The motor control system may further include the phase voltage and current detection circuit 1704 coupled with the inverter circuit. The detection circuit 1704 may be configured to measure one or more currents and voltages from the motor 1710. The detection circuit 1704 may be further configured to measure motor voltages from the motor 1710.

The inverter circuit 1702 may include a voltage source 1712 and a capacitor 1714 coupled to the voltage source 1712. The capacitor 1714 may be coupled in parallel to the voltage source 1712. The inverter circuit 1702 may further include power electronics, i.e., switching devices, such as, transistors 1716a, 1716b, 1716c, 1716d, 1716e, 1716f. The inverter circuit may include MOSFETs or IGBTs. The inverter circuit 1702 may also include anti-parallel free-wheeling diodes 1718a, 1718b, 1718c, 1718d, 1718e, 1718f. Electronics switching device 1718a may be coupled serially to switching device 1716b, and the pair of switching devices 1716a, 1716b may be coupled in parallel to capacitor 1714. Likewise, switching device 1716c may be coupled serially to switching device 1716d, and the pair of switching devices 1716c, 1716d may be coupled in parallel to capacitor 1714; switching devices 1716e may be coupled serially to switching devices 1716f, and the pair of switching devices 1716e, 1716f may be coupled in parallel to capacitor 1714. Diode 1718a may be coupled in parallel to switching device 1716a, anti-parallel freewheeling diode 1718b may be coupled in parallel to switching devices 1716b, diode 1718c may be coupled in anti-parallel to switching device 1716c, diode 1718d may be coupled in anti-parallel to transistor 1716d, diode 1718e may be coupled in anti-parallel to switching device 1716e, and diode 1718f may be coupled in anti-parallel to transistor 1716f.

The detection circuit 1704 may additionally be coupled to the motor 1710. The detection circuit 1704 may include a plurality of voltage sampling circuits for measuring a plurality of motor voltages. Each voltage sampling circuit may be coupled to the control circuit 1702. Each voltage sampling circuit may include a first resistor 1719a, 1719b or 1719c (of value $R_1$) and a second resistor 1720a, 1720b or 1720c (of value $R_2$). A capacitor 1726a, 1726b or 1726c may be coupled in parallel to each second resistor 1720a, 1720b or 1720c. Each voltage sampling circuit may be coupled to the control circuit 1702 at a first end (e.g. end nearer to the first resistor 1719a, 1719b or 1719c than second resistor 1720a, 1720b or 1720c) Each voltage sampling circuit may be coupled to a reference voltage (denoted by $V_{ref}$) at a second end (e.g. end nearer to the second resistor 1720a, 1720b or 1720c than the first resistor 1719a, 1719b or 1719c). Voltages $V_A$, $V_B$, $V_C$ may be measured at the junction between the first resistor 1718a, 1718b or 1718c and the second resistor 1720a, 1720b or 1720c.

In other words, a first end of resistor 1719a may be coupled to the inverter circuit 1702 (e.g. between transistors 1716a and 1716b). The second end of resistor 1719a may be coupled to the first end of resistor 1720a. The second end of resistor 1720a may be coupled to $V_{ref}$. Capacitor 1726a may include a first end coupled to the second end of resistor 1719a and may include a second end coupled to $V_{ref}$. Voltage $V_A$ may be measured at second end of resistor 1719a or first end of resistor 1720a.

Further, a first end of resistor 1719b may be coupled to the inverter circuit 1702 (e.g. between switching devices 1716c and 1716d). The second end of resistor 1719b may be coupled to the first end of resistor 1720b. The second end of resistor 1720b may be coupled to $V_{ref}$. Capacitor 1726b may include a first end coupled to the second end of resistor 1719b and may include a second end coupled to $V_{ref}$. Voltage $V_B$ may be measured at second end of resistor 1718b or first end of resistor 1720b.

Also, a first end of resistor 1719c may be coupled to the control circuit 1702 (e.g. between transistors 1716e and 1716f). The second end of resistor 1719c may be coupled to the first end of resistor 1720c. The second end of resistor 1720c may be coupled to $V_{ref}$. Capacitor 1726c may include a first end coupled to the second end of resistor 1719c and may include a second end coupled to $V_{ref}$. Voltage $V_C$ may be measured at second end of resistor 1719c or first end of resistor 1720c.

The detection circuit 1704 may include resistors 1722a, 1722b, 1722c. Each of resistor 1722a, 1722b, 1722c (of value Rs) may be coupled between the control circuit 1702 and the motor 1710. Resistor 1722a may be coupled at one end to between transistors 1716a and 1716b, resistor 1722b may be coupled at one end to between transistors 1716c and 1716d, and resistor 1722c may be coupled at one end to between transistors 1716e and 1716f. The other ends of resistors 1722a, 1722b, 1722c may be coupled to motor 1710. Voltages $Vi_{A+}$, $Vi_{A-}$ may be measured from two ends of resistor 1722a, voltages $Vi_{B+}$, $Vi_{B-}$ may be measured from two ends of resistor 1722b and voltages $Vi_{C+}$, $Vi_{C-}$ may be measured from two ends of resistor 1722c. Current flowing through resistor 1722a may be determined based on the voltages $Vi_{A+}$, Similarly, current flowing though 1722b may be determined based on voltages $Vi_{B+}$, $Vi_{B-}$ and current flowing though 1722c may be determined based on voltages $Vi_{C+}$, $Vi_{C-}$.

The motor control system may further include a reference voltage generation circuit 1724 for generating the reference voltage $V_{ref}$. The reference voltage generation circuit 1724 may generate the reference voltage based on $V_{DC}$ and ground voltage (GND).

Voltages across resistors 1722a, 1722b, 1722c may be coupled for instance to voltage filters 1246a, 1246b, 1246c illustrated in FIG. 9C. Voltages $Vi_{A+}$, $Vi_{B-}$ may be coupled to voltage filter 1246a, voltages $Vi_{B+}$, $Vi_{B-}$ may be coupled to voltage filter 1246b and voltages $Vi_{C+}$, $Vi_{C-}$ may be coupled to voltage filter 1246c. Voltages $V_A$, $V_B$, $V_C$ may not require further filtering.

Figure 13A:
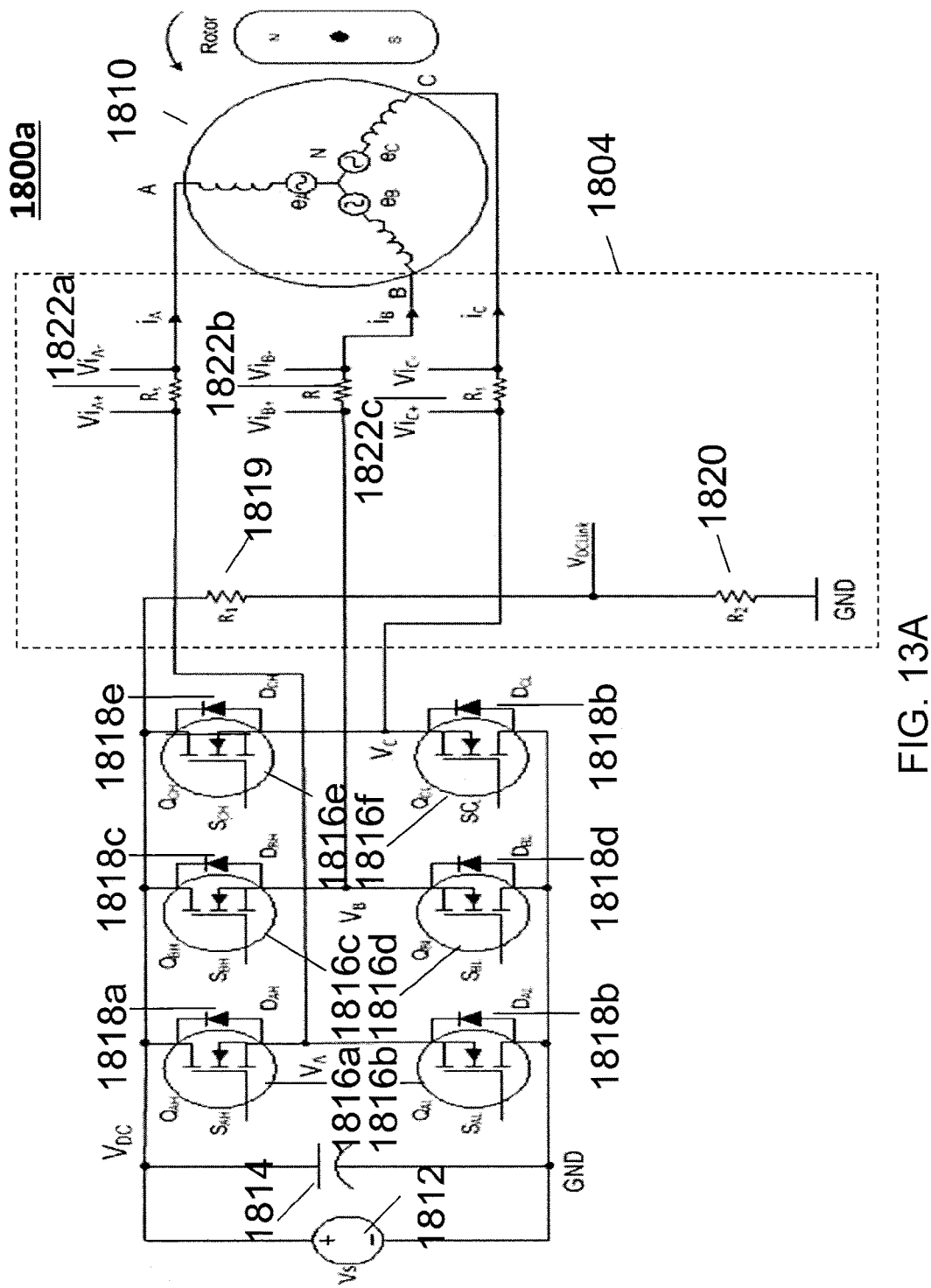
FIG. 13A is a schematic of a motor control system with voltage detection channels for controlling a motor according to various embodiments.

FIG. 13A is a schematic 1800 of a motor control system for controlling a motor 1810 according to various embodiments. The motor control system may include an inverter circuit 1802 configured to apply exciting voltages to the motor 1810. The motor control system may further include a detection circuit 1804 coupled with the inverter circuit 1802. The detection circuit 1804 may be configured to measure one or more currents from the motor 1810. The detection circuit 1804 may be further configured to measure a DC-link voltage from the motor 1810.

The inverter circuit 1802 may include a voltage source 1812 and a capacitor 1814 coupled to the voltage source 1812. The capacitor 1814 may be coupled in parallel to the voltage source 1812. The inverter circuit 1802 may further include power electronics, i.e., switching devices, such as, transistors 1816a, 1816b, 1816c, 1816d, 1816e, 1816f. The inverter circuit may include MOSFETs or IGBTs. The inverter circuit 1802 may also include anti-parallel freewheeling diodes 1818a, 1818b, 1818c, 1818d, 1818e, 1818f. Electronics switching device 1818a may be coupled serially to switching device 1816b, and the pair of switching devices 1816a, 1816b may be coupled in parallel to capacitor 1814. Likewise, switching device 1816c may be coupled serially to switching device 1816d, and the pair of switching devices 1816c, 1816d may be coupled in parallel to capacitor 1814; switching devices 1816e may be coupled serially to switching devices 1816f, and the pair of switching devices 1816e, 1816f may be coupled in parallel to capacitor 1814. Diode 1818a may be coupled in parallel to switching device 1816a, anti-parallel freewheeling diode 1818b may be coupled in parallel to switching devices 1816b, diode 1818c may be coupled in anti-parallel to switching device 1816c, diode 1818d may be coupled in anti-parallel to transistor 1816d, diode 1818e may be coupled in anti-parallel to switching device 1816e, and diode 1818f may be coupled in anti-parallel to transistor 1816f.

The detection circuit 1804 may additionally be coupled to the motor 1810. The detection circuit 1804 may include voltage divider for measuring a DC-link voltage. The voltage divider may include a first resistor 1818 (of value R1). The first resistor 1818 may include a first end coupled to the control circuit 1802 (e.g. to one end of voltage source 1812 for measuring direct current voltage $V_{DC}$). The second end of the first resistor 1818 may be coupled to a first end of resistor 1820. The second end of resistor 1820 may be coupled to ground (indicated by GND). A DC-link voltage ($V_{DCLink}$) may be measured from the second end of the first transistor 1818.

The detection circuit 1804 may include resistors 1822a, 1822b, 1822c. Each of resistor 1822a, 1822b, 1822c (of value Rs) may be coupled between the control circuit 1802 and the motor 1810. Resistor 1822a may be coupled at one end to between transistors 1816a and 1816b, resistor 1822b may be coupled at one end to between transistors 1816c and 1816d, and resistor 1822c may be coupled at one end to between transistors 1816e and 1816f. The other ends of resistors 1822a, 1822b, 1822c may be coupled to motor 1810. Voltages $Vi_{A+}$, $Vi_{A-}$ may be measured from two ends of resistor 1822a, voltages $Vi_{B+}$, $Vi_{B-}$ may be measured from two ends of resistor 1822b and voltages $Vi_{C+}$, $Vi_{C-}$ may be measured from two ends of resistor 1822c. Current flowing through resistor 1822a may be determined based on the voltages $Vi_{A+}$, $Vi_{A-}$. Similarly, current flowing though 1822b may be determined based on voltages $Vi_{B+}$, $Vi_{B-}$ and current flowing though 1822c may be determined based on voltages $Vi_{C+}$, $Vi_{C-}$.

Figure 13B:
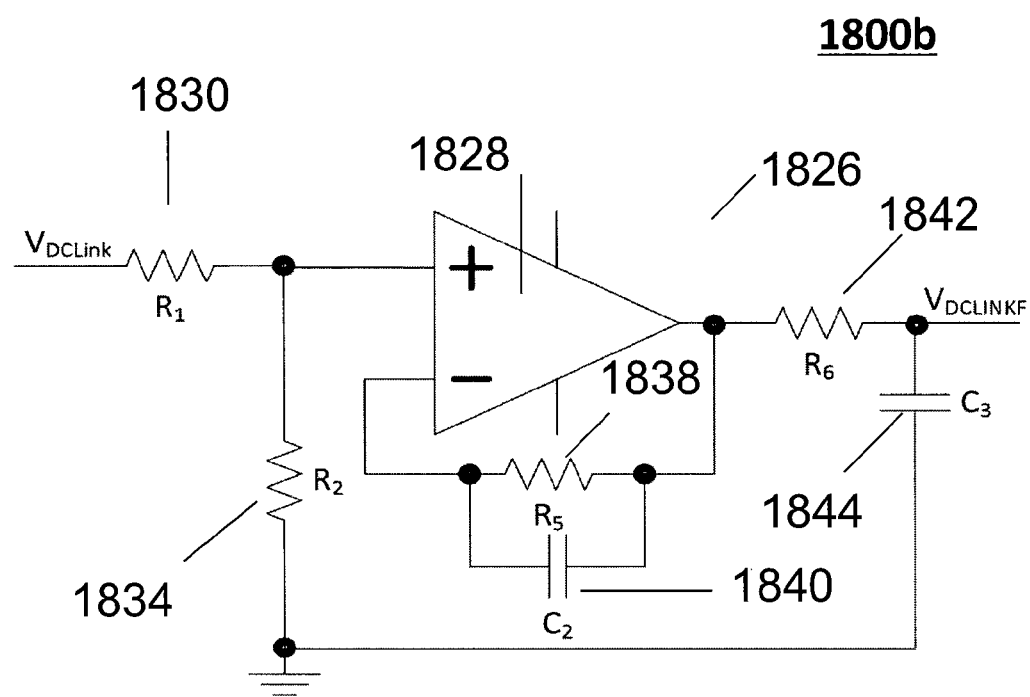
FIG. 13B is a schematic of a direct current link voltage (DC-link voltage) detection circuit with a resistance-capacitance (RC) low pass filter according to various embodiments.

FIG. 13B is a schematic of a DC-link voltage detection circuit with a RC low pass filter 1826 according to various embodiments. The voltage filter 1826 may include an operational amplifier 1828.

Resistors 1830 may be coupled to the non-inverting input of amplifier 1828. The DC-link voltage $V_{DCLink}$ as shown in FIG. 13A may be coupled to resistor 1830. A first end of resistor 1834 may be also coupled to the non-inverting input while the second end of resistor 1834 may be coupled to ground. Resistor 1838 may be coupled between output of amplifier 1828 and inverting input of amplifier 1828. Capacitor 1840 may be coupled in parallel to resistor 1838. Resistor 1842 may be coupled to output of amplifier 1828 at a first end of resistor 1842 and the filtered voltage $V_{DCLINKF}$ may be measured at a second end of resistor 1842. Capacitor 1844 may be coupled between the second end of resistor 1842 and ground.

Voltages across resistors 1822a, 1822b, 1822c may be coupled for instance to voltage filters 1246a, 1246b, 1246c illustrated in FIG. 9C. Voltages $Vi_{A+}$, $Vi_{A-}$ may be coupled to voltage filter 1246a, voltages $Vi_{B+}$, $Vi_{B-}$ may be coupled to voltage filter 1246b and voltages $Vi_{C+}$, $Vi_{C-}$ may be coupled to voltage filter 1246c.

Figure 14:
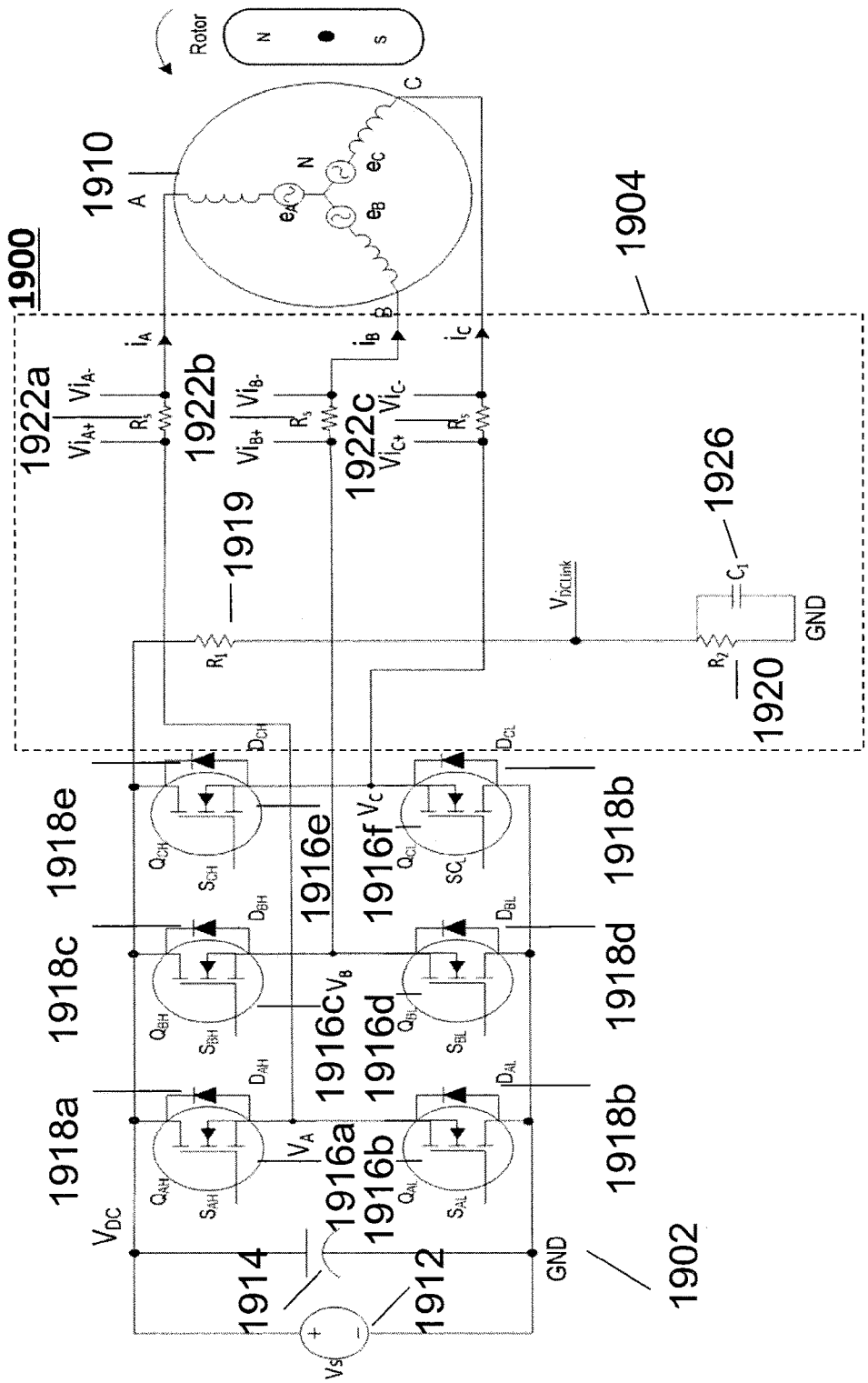
FIG. 14 is a schematic of a motor control system for controlling a motor according to various embodiments.

FIG. 14 is a schematic 1900 of a motor control system for controlling a motor 1910 according to various embodiments. The motor control system may include a control circuit 1902 configured to apply exciting voltages to the motor 1910. The motor control system may further include a detection circuit 1904 coupled with the control circuit. The detection circuit 1904 may be configured to measure one or more currents from the motor 1910. The detection circuit 1904 may be further configured to measure a DC-link voltage from the motor 1910.

The inverter circuit 1902 may include a voltage source 1912 and a capacitor 1914 coupled to the voltage source 1912. The capacitor 1914 may be coupled in parallel to the voltage source 1912. The inverter circuit 1902 may further include power electronics, i.e., switching devices, such as, transistors 1916a, 1916b, 1916c, 1916d, 1916e, 1916f. The inverter circuit may include MOSFETs or IGBTs. The inverter circuit 1902 may also include anti-parallel freewheeling diodes 1918a, 1918b, 1918c, 1918d, 1918e, 1918f. Electronics switching device 1918a may be coupled serially to switching device 1916b, and the pair of switching devices 1916a, 1916b may be coupled in parallel to capacitor 1914. Likewise, switching device 1916c may be coupled serially to switching device 1916d, and the pair of switching devices 1916c, 1916d may be coupled in parallel to capacitor 1914; switching devices 1916e may be coupled serially to switching devices 1916f, and the pair of switching devices 1916e, 1916f may be coupled in parallel to capacitor 1914. Diode 1918a may be coupled in parallel to switching device 1916a, anti-parallel freewheeling diode 1918b may be coupled in parallel to switching devices 1916b, diode 1918c may be coupled in anti-parallel to switching device 1916c, diode 1918d may be coupled in anti-parallel to transistor 1916d, diode 1918e may be coupled in anti-parallel to switching device 1916e, and diode 1918f may be coupled in anti-parallel to transistor 1916f.

The detection circuit 1904 may additionally be coupled to the motor 1910. The detection circuit 1904 may include a voltage sampling circuits for measuring the DC-link voltage. The voltage sampling circuit may be coupled to the inverter circuit 1902. The voltage sampling circuit may include a first resistor 1919 (of value $R_1$) and a second resistor 1920 (of value $R_2$). A capacitor 1926 may be coupled in parallel to the second resistor 1920. The voltage sampling circuit may be coupled to the inverter circuit 1902 at a first end (e.g. end nearer to the first resistor 1919 than second resistor 1920) The voltage sampling circuit may be coupled to a voltage such as ground (denoted by GND) at a second end (e.g. end nearer to the second resistor 1920 than the first resistor 1919). Voltages $V_{DCLink}$ may be measured at the junction between the first resistor 1919 and the second resistor 1920.

In other words, a first end of resistor 1919 may be coupled to the inverter circuit 1902 (e.g. to one end of voltage source 1912 for measuring direct current voltage $V_{DC}$). The second end of resistor 1919 may be coupled to the first end of resistor 1920. The second end of resistor 1920 may be coupled to a voltage such as ground. Capacitor 1926 may include a first end coupled to the second end of resistor 1919 and may include a second end coupled to the voltage (e.g. ground). Voltage $V_{DCLink}$ may be measured at second end of resistor 1919 or first end of resistor 1920.

The detection circuit 1904 may include resistors 1922a, 1922b, 1922c. Each of resistor 1922a, 1922b, 1922c (of value Rs) may be coupled between the control circuit 1902 and the motor 1910. Resistor 1922a may be coupled at one end to between transistors 1916a and 1916b, resistor 1922b may be coupled at one end to between transistors 1916c and 1916d, and resistor 1922c may be coupled at one end to between transistors 1916e and 1916f. The other ends of resistors 1922a, 1922b, 1922c may be coupled to motor 1910. Voltages $Vi_{A+}$, $Vi_{A-}$ may be measured from two ends of resistor 1922a, voltages $Vi_{B+}$, $Vi_{B-}$ may be measured from two ends of resistor 1922b and voltages $Vi_{C+}$, $Vi_{C-}$ may be measured from two ends of resistor 1922c. Current flowing through resistor 1922a may be determined based on the voltages $Vi_{A+}$, $Vi_{A-}$. Similarly, current flowing though 1922b may be determined based on voltages $Vi_{B+}$, $Vi_{B-}$ and current flowing though 1922c may be determined based on voltages $Vi_{C+}$, $Vi_{C-}$.

Voltages across resistors 1922a, 1922b, 1922c may be coupled for instance to voltage filters 1246a, 1246b, 1246c illustrated in FIG. 9C. Voltages $Vi_{A+}$, $Vi_{A-}$ may be coupled to voltage filter 1246a, voltages $Vi_{B+}$, $Vi_{B-}$ may be coupled to voltage filter 1246b and voltages $Vi_{C+}$, $Vi_{C-}$ may be coupled to voltage filter 1246c. Voltage $V_{DCLink}$ may not require further filtering.

Figure 15:
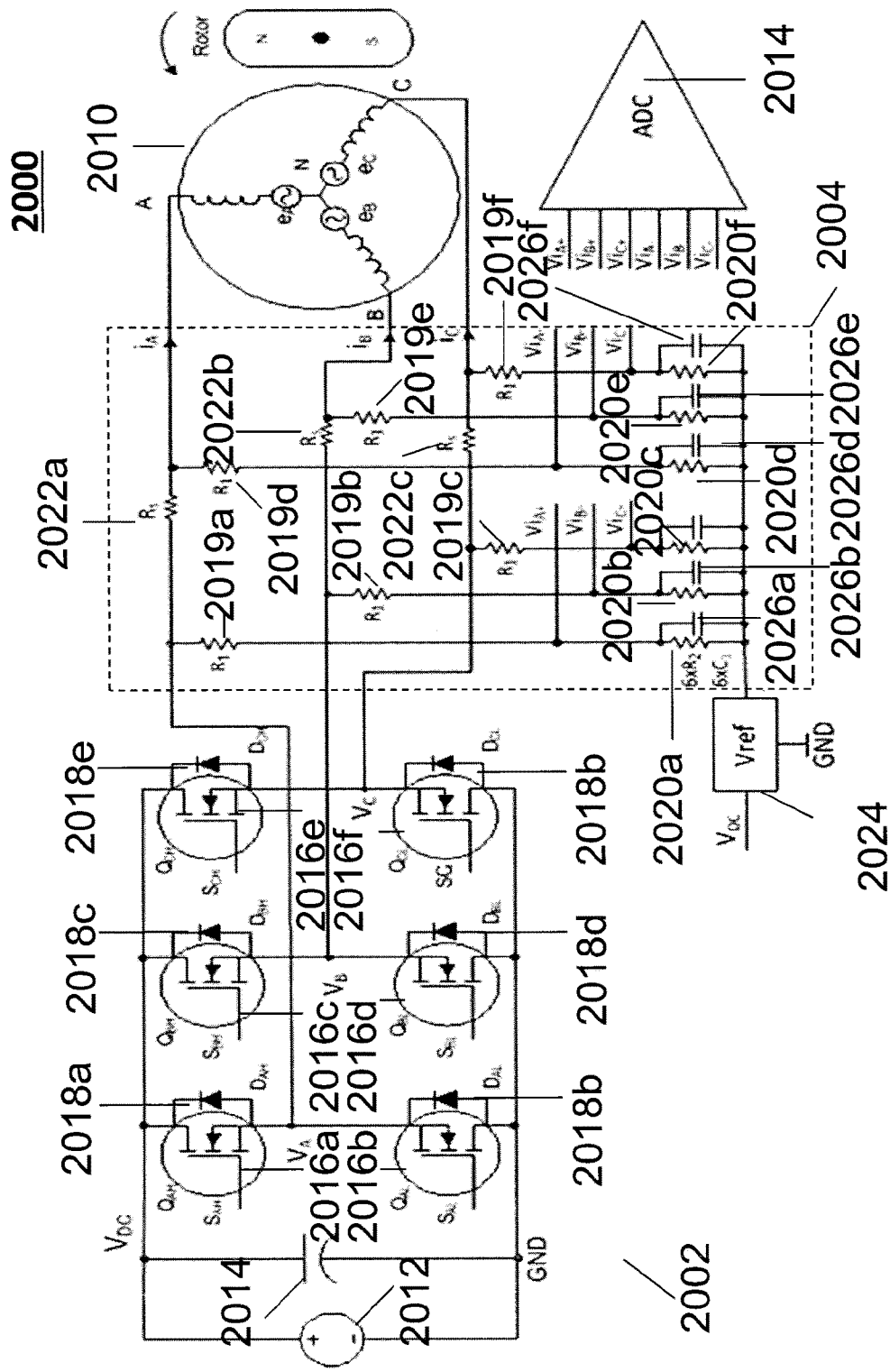
FIG. 15 is a schematic of a motor control system to detect voltages and currents more accurately through taking account of voltage drops of conducting freewheeling diodes according to various embodiments.

FIG. 15 is a schematic 2000 of a motor control system for controlling a motor 2010 according to various embodiments. The motor control system may include an inverter circuit 2002 configured to apply exciting voltages to the motor 2010. The motor control system may further include a detection circuit 2004 coupled with the control circuit. The detection circuit 2004 may be configured to measure one or more currents from the motor 2010.

The inverter circuit 2002 may include a voltage source 2012 and a capacitor 2014 coupled to the voltage source 2012. The capacitor 2014 may be coupled in parallel to the voltage source 2012. The inverter circuit 2002 may further include power electronics, i.e., switching devices, such as, transistors 2016a, 2016b, 2016c, 2016d, 2016e, 2016f. The inverter circuit may include MOSFETs or IGBTs. The inverter circuit 2002 may also include anti-parallel freewheeling diodes 2018a, 2018b, 2018c, 2018d, 2018e, 2018f. Electronics switching device 2018a may be coupled serially to switching device 2016b, and the pair of switching devices 2016a, 2016b may be coupled in parallel to capacitor 2014. Likewise, switching device 2016c may be coupled serially to switching device 2016d, and the pair of switching devices 2016c, 2016d may be coupled in parallel to capacitor 2014; switching devices 2016e may be coupled serially to switching devices 2016f, and the pair of switching devices 2016e, 2016f may be coupled in parallel to capacitor 2014. Diode 2018a may be coupled in parallel to switching device 2016a, anti-parallel freewheeling diode 2018b may be coupled in parallel to switching devices 2016b, diode 2018c may be coupled in anti-parallel to switching device 2016c, diode 2018d may be coupled in anti-parallel to transistor 2016d, diode 2018e may be coupled in anti-parallel to switching device 2016e, and diode 2018f may be coupled in anti-parallel to transistor 2016f.

The detection circuit 2004 may include resistors 2022a, 2022b, 2022c. Each of resistor 2022a, 2022b, 2022c (of value Rs) may be coupled between the control circuit 2002 and the motor 2010. Resistor 2022a may be coupled at one end to between transistors 2016a and 2016b, resistor 2022b may be coupled at one end to between transistors 2016c and 2016d, and resistor 2022c may be coupled at one end to between transistors 2016e and 2016f. The other ends of resistors 2022a, 2022b, 2022c may be coupled to motor 2010.

Voltages $Vi_{A+}$, $Vi_{A-}$ may be measured from two ends of resistor 2022a by voltage sampling circuits, voltages $Vi_{B+}$, $Vi_{B-}$ may be measured from two ends of resistor 2022b by voltage sampling circuits and voltages $Vi_{C+}$, $Vi_{C-}$ may be measured from two ends of resistor 2022c by voltage sampling circuits.

A first voltage sampling circuit may be connected at a first end of resistor 2022a, the voltage sampling circuit including a first resistor 2019a coupled in series with a second resistor 2020a. The first end of the first resistor 2019a may be coupled to a first end of resistor 2022a. The second end of the first resistor 2019a may be coupled to a first end of second resistor 2020a. The second end of the second resistor 2020a may be coupled to a reference voltage $V_{ref}$. A capacitor 2026a may be coupled in parallel to the second resistor 2020a. A first end of the capacitor 2026a may be coupled to a second end of first resistor 2019a and a second end of the capacitor 2026a may be coupled to the reference voltage $V_{ref}$. Voltage $Vi_{A+}$ may be measured from the second end of the first resistor 2019a.

A second voltage sampling circuit may be connected at a second end of resistor 2022a, the voltage sampling circuit including a first resistor 2019d coupled in series with a second resistor 2020d. The first end of the first resistor 2019d may be coupled to a second end of resistor 2022a. The second end of the first resistor 2019d may be coupled to a first end of second resistor 2020d. The second end of the second resistor 2020d may be coupled to the reference voltage $V_{ref}$. A capacitor 2026d may be coupled in parallel to the second resistor 2020d. A first end of the capacitor 2026d may be coupled to a second end of first resistor 2019d and a second end of the capacitor 2026d may be coupled to the reference voltage $V_{ref}$. Voltage $Vi_{A-}$ may be measured from the second end of the first resistor 2019d.

Similarly, a first voltage sampling circuit may be connected at a first end of resistor 2022b, the voltage sampling circuit including a first resistor 2019b coupled in series with a second resistor 2020b. The first end of the first resistor 2019b may be coupled to a first end of resistor 2022b. The second end of the first resistor 2019b may be coupled to a first end of second resistor 2020b. The second end of the second resistor 2020b may be coupled to a reference voltage $V_{ref}$. A capacitor 2026b may be coupled in parallel to the second resistor 2020b. A first end of the capacitor 2026b may be coupled to a second end of first resistor 2019b and a second end of the capacitor 2026b may be coupled to the reference voltage $V_{ref}$. Voltage $Vi_{B+}$ may be measured from the second end of the first resistor 2019b.

A second voltage sampling circuit may be connected at a second end of resistor 2022b, the voltage sampling circuit including a first resistor 2019e coupled in series with a second resistor 2020e. The first end of the first resistor 2019e may be coupled to a second end of resistor 2022b. The second end of the first resistor 2019e may be coupled to a first end of second resistor 2020e. The second end of the second resistor 2020e may be coupled to the reference voltage $V_{ref}$. A capacitor 2026e may be coupled in parallel to the second resistor 2020e. A first end of the capacitor 2026e may be coupled to a second end of first resistor 2019e and a second end of the capacitor 2026e may be coupled to the reference voltage $V_{ref}$. Voltage $Vi_{B-}$ may be measured from the second end of the first resistor 2019e.

Also, a first voltage sampling circuit may be connected at a first end of resistor 2022c, the voltage sampling circuit including a first resistor 2019c coupled in series with a second resistor 2020c. The first end of the first resistor 2019c may be coupled to a first end of resistor 2022c. The second end of the first resistor 2019c may be coupled to a first end of second resistor 2020c. The second end of the second resistor 2020c may be coupled to a reference voltage $V_{ref}$. A capacitor 2026c may be coupled in parallel to the second resistor 2020c. A first end of the capacitor 2026c may be coupled to a second end of first resistor 2019c and a second end of the capacitor 2026c may be coupled to the reference voltage $V_{ref}$. Voltage $Vi_{C+}$ may be measured from the second end of the first resistor 2019c.

A second voltage sampling circuit may be connected at a second end of resistor 2022c, the voltage sampling circuit including a first resistor 2019f coupled in series with a second resistor 2020f. The first end of the first resistor 2019f may be coupled to a second end of resistor 2022c. The second end of the first resistor 2019f may be coupled to a first end of second resistor 2020f. The second end of the second resistor 2020f may be coupled to the reference voltage $V_{ref}$. A capacitor 2026f may be coupled in parallel to the second resistor 2020f. A first end of the capacitor 2026f may be coupled to a second end of first resistor 2019f and a second end of the capacitor 2026f may be coupled to the reference voltage $V_{ref}$. Voltage $Vi_{C-}$ may be measured from the second end of the first resistor 2019f.

Current flowing through resistor 2022a may be determined based on the voltages $Vi_{A+}$, $Vi_{A-}$. Similarly, current flowing though 2022b may be determined based on voltages $Vi_{B+}$, $Vi_{B-}$ and current flowing though 2022c may be determined based on voltages $Vi_{C+}$, $Vi_{C-}$.

The motor control system may further include a reference voltage generation circuit 2024 for generating the reference voltage $V_{ref}$.

The motor control system may further include an analog-to-digital converter (ADC) 2014 coupled to the detection circuit 2004. Voltages $V_{A+}$, $Vi_{A-}$, $Vi_{B+}$, $Vi_{B-}$, $Vi_{C+}$, $Vi_{C-}$ may be coupled to the ADC 2014. In various embodiments, one of the currents (e.g. $i_C$) may be calculated from the two other currents (e.g. $i_A$, $i_B$) instead of being measured. The ADC may be a 12 bit, 14 bit, or 15 bit or 16 bit ADC. The motor control system may not require operational amplifiers. The filtered phase voltages may be provided by:

$$V_{AnF}=R_1+R_2/R_2[2/3 Vi_{A-}-1/3(Vi_{B-}+Vi_{C-})]$$

$$V_{BnF}=R_1+R_2/R_2[2/3 Vi_{B-}-1/3(Vi_{C-}+Vi_{A-})]$$

$$V_{CnF}=R_1+R_2/R_2[2/3 Vi_{C-}-1/3(Vi_{A-}+Vi_{B-})] \quad (26)$$

where $V_{AnF}$, $V_{Bnf}$ and $V_{CnF}$ are the filtered phase voltages. The phase currents may be provided by:

$$i_{AF}=R_1+R_2/R_2R_s(Vi_{A+}-Vi_{A-})$$

$$i_{BF}=R_1+R_2/R_2R_s(Vi_{B+}-Vi_{B-})$$

$$i_{CF}=R_1+R_2/R_2R_s(Vi_{C+}-Vi_{C-}) \quad (27)$$

where $i_{AF}$, $i_{BF}$, $i_{CF}$ are the filtered phase voltages.

Figure 16:
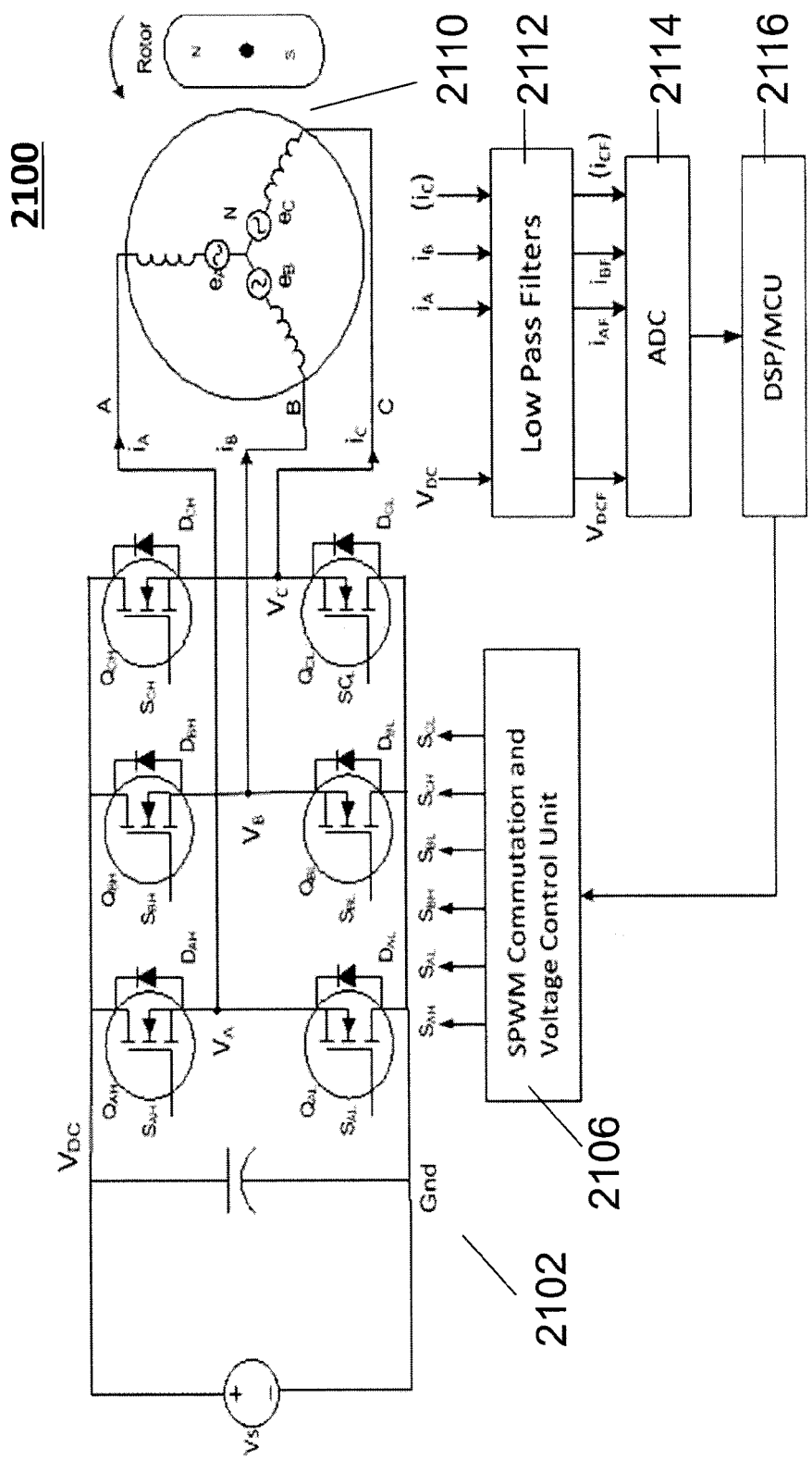
FIG. 16 is a schematic of a motor control system with three phase current detection channels and one direct current link voltage (DC-link voltage) detection channel for controlling a motor according to various embodiments.

FIG. 16 is a schematic 2100 of a motor control system for controlling a motor 2110 according to various embodiments. The motor control system may include an inverter circuit 2102 configured to apply exciting voltages to the motor 2110. The motor control system may further include a detection circuit coupled with the control circuit. The detection circuit may be configured to measure one or more currents (e.g. $i_A$, $i_B$) from the motor 2110. A further current (e.g. $i_C$) may not be measured but may be calculated from the one or more currents measured (e.g. $i_A$, $i_B$). The detection circuit may be further configured to measure a DC-link voltage (e.g. $V_{DC}$) from the inverter circuit 2102 or motor voltages from the motor 2110. The motor control system may also include a control unit 2106 coupled with the inverter circuit 2102 and the current and voltage detection circuit. The control unit 2106 may be configured to calculate one or more back electromotive force voltages based on the one or more currents (and further current). The control unit 2106 may be configured to calculate one or more back electromotive force voltages further based on the direct current voltage or motor voltages. The control unit 2106 may be further configured to modify or adjust the exciting voltages based on the one or more back electromotive force voltages.

The motor control system may further include one or more filters 2112. The one or more filters may include one or more current detection low pass filters and/or one or more voltage low pass filters. The one or more voltage low pass filters may be configured to generate a filtered DC-link voltage signal (e.g. $V_{DCF}$) based on the DC-link voltage (e.g. $V_{DC}$). The one or more voltage low pass filters may additionally or alternatively be configured to generate one or more filtered motor voltage signals based on the one or more motor voltages. The voltage low pass filters may be configured to filter each of the motor voltages to generate one or more filtered motor voltage signals. The current detection low pass filter may be configured to filter each of the one or more currents (e.g. $i_A$, $i_B$) as well as the further current (e.g. $i_C$) to generate one or more filtered current signals (e.g. $i_{AF}$, $i_{BF}$, $i_{CF}$). For instance, filtered current $i_{AF}$ may be generated based on measured current $i_A$, filtered current $i_{BF}$ may be generated based on measured current $i_B$ and filtered current $i_{CF}$ may be generated based on calculated current $i_C$. In various embodiments the filtered current $i_{CF}$ may be calculated based on $i_{AF}$ and $i_{BF}$.

The motor control system may further include an analog to digital converter circuit 2114 coupled to the one or more filters 2112. The motor control system may also include a signal processing circuit 2116 such as a digital signal processing or microcontroller unit coupled to the ADC circuit 2114. The signal processing circuit may further be coupled to the control unit 2106.

As highlighted previously, by applying the filtered phase voltages and currents in Equations (26) and (27) to Equations (7), (8) and (15), the phase difference θ between the current vector and back EMF vector may be estimated. The EMF vector may be provided by:

$$e_{AF} = V_{AnF} - Ri_{AF} - L_e \frac{di_{AF}}{dt} \quad (28)$$

$$e_{BF} = V_{BnF} - Ri_{BF} - L_e \frac{di_{BF}}{dt}$$

$$e_{CF} = V_{CnF} - Ri_{CF} - L_e \frac{di_{CF}}{dt}$$

The current vector angle and the back EMF vector angle may be provided by:

$$\theta_I = \tan^{-1} \frac{\sqrt{3}\, i_{AF}(t)}{i_{BF}(t) - i_{CF}(t)} \quad (29)$$

-continued $$\theta_E = \tan^{-1} \frac{\sqrt{3}\, e_{AF}(t)}{e_{BF}(t) - e_{CF}(t)}$$

Various embodiments may achieve substantially constant speed with small jitter. Various embodiments may achieve less current harmonics so that the vibration and acoustic noise are lower. Various embodiments may enable a motor to run with high efficiency. Various embodiments may reduce complexity of control and implementation as various embodiments may relate to a single input and single output (SISO) system. Various embodiments may not require zero-current-current window for detecting zero-crossing points of phase back EMF or rotor position. Various embodiments may require only three terminals. The centre tap may not be required. Reliability may be improved and costs may be lower.

Various embodiments propose a new V/F control system to drive permanent magnet (PM) spindle motors, in particular axial field or surface-mounted PM synchronous motors, to spin at a constant speed with the small current harmonic components for low acoustic noise, low current fundamental amplitude for high efficiency and small speed jitter as well as with a rational cost. The key technologies may be as follows:

1) Apply a frequency-fixed three phase PWM exciting voltages to drive a PM motor,
2) Apply low pass filters to three terminal voltages or one DC link voltage, and three or two phase currents among three phase currents,
3) Measure the filtered voltage(s) and currents to get the filtered three phase voltages and three phase currents,
4) Calculate the angle of stator current vector,
5) Calculate the phase back EMF through subtracting the voltage drops on the resistance and inductance from the measured phase voltages,
6) Calculate the angle of back EMF vector,
7) Obtain the phase difference between current vector and back EMF vector. If necessary, another LPF is applied to the phase difference.
8) When the difference is positive, i.e., current vector angle is larger than the back EMF vector angle, bigger amplitude phase voltage should be applied. In such a case, the rotor magnet field is behind or slower than the magnet field generated by phase exciting currents. So bigger currents will generate a stronger torque to pull the rotor to follow exciting magnetic field, i.e., to keep synchronously rotating with exciting current angular speed,
9) When the difference is negative, smaller amplitude phase voltage should be applied. The rotor magnet field is in front of or faster than the magnet field of phase exciting currents. So smaller currents will generate a smaller torque to slow the rotor to synchronously rotate with exciting current angular speed,
10) When the phase difference is zero, the current vector is ideal synchronously with back EMF vector and then the motor operates at the smallest current fundamental amplitude and with the smallest input power.
11) A proportional-Integral control or sliding-mode control or other advanced control is needed to dynamically adjust the amplitude of the applied three phase voltages according to the phase difference between the current vector and back EMF vector. So the phase difference is always close to zero and is kept to zero as the load torque is changed,
12) In order to reduce the cost of the system, 5 kinds of useful voltage and current sampling circuits are provided for the trade-off design of the system performance and cost.

Since the proposed V/F method employs neither conventional zero-current window method to detect the transient moments of zero-crossing points of each phase back EMF nor an over-exciting current V/F mode, it may realize the smallest current harmonics and high efficiency as well as low speed jitter. Therefore, various embodiments may be widely used in hard disk drive industry and other industries through developing unique comb chip of spindle motors or MCUs embedded with the invented solution.

Various embodiments are presented below

1. A method of controlling a motor, the method including applying one or more exciting voltages to a motor; measuring one or more currents from the motor; calculating one or more back electromotive force voltages (BEMF) based on the one or more currents; and adjusting the one or more exciting voltages based on the one or more BEMF voltages.

2. The method according to statement 1, wherein adjusting the one or more exciting voltages is further based on the one or more currents.

3. The method according to statement 1 or statement 2, wherein adjusting the one or more exciting voltages includes calculating a current phase based on the one or more currents; calculating an BEMF voltage phase based on the one or more BEMF voltages; calculating a phase difference based on the current phase and the BEMF voltage phase; and adjusting the one or more exciting voltages based on the phase difference.

4. The method according to statement 3, wherein calculating the phase difference comprises subtracting the BEMF voltage phase from the current phase to calculate the phase difference.

5. The method according to statement 3 or statement 4, wherein adjusting the one or more exciting voltages includes applying a low pass phase difference filter to the phase difference to generate a filtered phase difference signal; and adjusting the one or more exciting voltages based on the filtered phase difference signal.

6. The method according to any of statements 3 to 5, wherein adjusting the one or more exciting voltages further includes decreasing amplitudes of the one or more exciting voltages to slow down speed of rotation of the motor when the phase difference is negative and increasing the amplitudes of the one or more exciting voltages to increase the speed of rotation of the motor when the phase difference is positive.

7. The method according to any of statements 1 to 6, wherein the one or more exciting voltages are applied to a stator of the motor; and wherein the one or more currents are detected from the stator of the motor.

8. The method according to any of statements 1 to 7, the method further including measuring a DC-link voltage (also known as direct current link voltage) from the inverter circuit, and calculating one or more back electromotive force voltages further based on the DC-link voltage.

9. The method according to statement 8, the method further including applying a voltage low pass filter to the DC-link voltage to generate a filtered DC-link voltage signal; and calculating one or more BEMF voltages further based on the filtered DC-link voltage signal.

10. The method according to any of statements 1 to 7, the method further including measuring one or more motor voltages from the motor; and calculating one or more BEMF voltages further based on the motor voltages.

11. The method according to statement 10, the method further including applying a voltage low pass filter to each of the one or more motor voltages to generate one or more filtered motor voltage signals; and calculating the one or more BEMF voltages is further based on the one or more filtered motor voltage signals.

12. The method according to any of statements 1 to 11, the method further including applying a current detecting low pass filter to each of the one or more currents to generate one or more filtered current signals; and wherein calculating the one or more BEMF voltages is based on the one or more filtered current signals.

13. The method according to statement 12, wherein adjusting the one or more exciting voltages is further based on the one or more filtered current signals.

14. The method according to any of statements 1 to 13, wherein the one or more exciting voltages are voltages varying at a fixed frequency.

15. The method according to any of statements 1 to 14, wherein the one or more exciting voltages are sinusoidal PWM voltages.

16. The method according to any of statements 1 to 15, wherein the motor is a multi-phase motor having multiple phase coils.

17. The method according to statement 16, wherein applying the one or more exciting voltages includes applying an exciting voltage to each phase coil of the multi-phase motor; wherein measuring the one or more currents includes measuring one current from each phase coil of the multi-phase motor; wherein calculating the one or more BEMF voltages includes calculating one BEMF voltage in each phase coil of the multi-phase motor based on the current in each phase coil of the multi-phase motor; and wherein adjusting the one or more exciting voltages includes adjusting the one or more exciting voltages based on the BEMF voltages.

18. The method according to statement 17, wherein adjusting the one or more exciting voltages is further based on the currents.

19. The method according to statement 16, wherein applying the one or more exciting voltages includes applying an exciting voltage to each phase coil of the multi-phase motor; wherein measuring the one or more currents includes measuring a first current from a phase first coil of the multiple phase coils of the multi-phase motor, and calculating a last current in a last phase coil in each phase coil of the multi-phase motor based on the current; wherein calculating the one or more BEMF includes calculating one BEMF voltage in each phase coil of the multi-phase motor based on the currents measured or calculated in each coil of the multi-phase motor; and wherein adjusting the one or more exciting voltages includes adjusting the one or more exciting voltages based on BEMF voltages.

20. The method according to statement 19, wherein measuring the one or more currents further includes measuring one or more subsequent currents from one or more subsequent coils of the multiple coils of the multi-phase motor and calculating the last current further based on the one or more subsequent currents.

21. The method according to statement 19 or statement 20, wherein adjusting the one or more exciting voltages is further based on the currents.

22. The method according to any of statements 1 to 21, wherein the motor is a three-phase motor having three phase coils.

23. A motor control system for controlling a motor, the motor control system including a control circuit configured to apply one or more exciting voltages to the motor; a current detection circuit coupled with the inverter circuit, the current detection circuit configured to measure one or more currents from the motor; a control unit coupled with the inverter circuit and the current detection circuit, the control unit configured to calculate one or more BEMF voltages based on the one or more currents; the control unit further configured to modify the one or more exciting voltages based on the one or more BEMF voltages.

24. The motor control system according to statement 23, wherein the control unit is further configured to modify the one or more exciting voltages based on the one or more currents.

25. The motor control system according to statement 23 or statement 24, wherein the control unit is further configured to calculate a current phase based on the one or more currents; wherein the control unit is further configured to calculate a BEMF voltage phase based on the one or more BEMF voltages; wherein the control unit is further configured to calculate a phase difference based on the current phase and the BEMF voltage phase; and wherein the control unit is further configured to modify the one or more exciting voltages based on the phase difference.

26. The motor control system according to statement 25, wherein the control unit is further configured to calculate the phase difference by subtracting the BEMF voltage phase from the current phase.

27. The motor control system according to statement 25 or statement 26, wherein the control unit includes a phase difference filter, the phase difference filter configured to generate a filtered phase difference signal; and wherein the control unit is configured to modify the one or more exciting voltages based on the filtered phase difference signal.

28. The motor control system according to any of statements 25 to 27, wherein the control unit is configured to decrease amplitudes of the one or more exciting voltages to slow down the speed of rotation of the motor when the phase difference is negative and to increase the amplitudes of the one or more exciting voltages to increase the speed of rotation of the motor when the phase difference is positive.

29. The motor control system according to any of statements 23 to 28, the motor control system further including a DC-link voltage detection circuit configured to be coupled with the inverter circuit, the DC-link voltage detection circuit configured to measure a DC-link voltage; and wherein the one or more BEMF voltages is calculated based on the DC-link voltage.

30. The motor control system according to statement 29, the motor control system further including a voltage low pass filter coupled to the DC-link or exciting voltage detection circuit and the control unit, the voltage low pass filter configured to generate a filtered DC-link or exciting voltage signal based on the DC-link or exciting voltage; and wherein the one or more BEMF voltages is calculated based on the filtered DC-link or exciting voltage signal.

31. The motor control system according to any of statements 23 to 28, the motor control system further including a motor voltage detection circuit configured to be coupled with the motor, the motor voltage detection circuit configured to detect one or more motor voltages; and wherein the one or more back electromotive force voltages is calculated based on the one or more motor voltages.

32. The motor control system according to statement 31, the motor control system further including a voltage low pass filter coupled to the motor voltage detection circuit and the control unit, the voltage low pass filter configured to generate one or more filtered motor voltage signals based on the one or more motor voltages; and wherein the one or more BEMF voltages is calculated based on the one or more filtered motor voltage signals.

33. The motor control system according to any of statements 23 to 32, wherein the control unit includes one or more current detection low pass filters, each current detection low pass filter configured to filter each of the one or more currents to generate one or more filtered current signals; wherein the one or more BEMF voltages is calculated based on the one or more filtered current signals; and wherein exciting voltages are adjusted based on the one or more detection or back electromotive force voltages.

34. The motor control system according to statement 34, wherein exciting voltages are adjusted further based on the one or more filtered current signals.

35.

36. The motor control system according to any of statements 30, 33, 34 or 35, wherein the control unit further includes an analog to digital converter circuit coupled to the low pass filters.

37. The motor control system according to any of statements 30, 33, 34 or 35, wherein each of the low pass filters includes an operational amplifier.

38. The motor control system according to any of statements 23 to 37, wherein the control unit further includes a control circuit coupled to the inverter circuit; wherein the control unit is configured to calculate the one or more BEMF voltages based on the one or more currents; and wherein the control unit is further configured to control adjusting the exciting voltages based on the one or more BEMF voltages.

39. The motor control system according to statement 38, wherein the control unit is further configured to control adjusting the exciting voltages based on the one or more currents.

40. The motor control system according to any of statements 23 to 39, further including the motor.

41. The motor control system according to statement 40, wherein the motor includes a rotor and a stator; wherein the inverter is configured to apply exciting voltages to the stator; and wherein the current detection circuit is configured to measure one or more currents from the stator.

42. The motor control system according to statement 41, wherein the rotor includes a permanent magnet.

43. The motor control system according to any of statements 40 to 42, wherein the motor is a multi-phase motor.

44. The motor control system according to any of statements 40 to 43, wherein the motor is a synchronous motor.

45. The motor control system according to any of statements 40 to 44, wherein the motor is one of a radial field surface mounted permanent synchronous motor (SPMSM), an axial field surface mounted permanent synchronous motor (SPMSM), a radial field interior mounted permanent magnet synchronous motor (IPMSM) or an axial field interior mounted permanent magnet synchronous motor (IPMSM).

46. The motor control system according to any of statements 23 to 45, wherein the exciting voltages are voltages varying at a fixed frequency.

47. The motor control system according to any of statements 23 to 46, wherein the exciting voltages are sinusoidal voltages.

48. The motor control system according to statement 47, wherein the sinusoidal voltages are pulse width modification (PWM) sinusoidal voltages or continuous sinusoidal voltages, such as an output from a linear amplifier.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of controlling a motor, the method comprising:
    applying one or more exciting voltages to the motor;
    measuring one or more currents from the motor;
    calculating one or more back electromotive force voltages based on the one or more currents; and
    adjusting the one or more exciting voltages based on the one or more back electromotive force voltages,
    wherein adjusting the one or more exciting voltages comprises:
        calculating a current phase based on the one or more currents;
        calculating a back electromotive force voltage phase based on the one or more back electromotive force voltages;
        calculating a phase difference based on the current phase and the back electromotive force voltage phase;
        decreasing amplitudes of the one or more exciting voltages to slow down speed of rotation of the motor when the phase difference is negative; and
        increasing the amplitudes of the one or more exciting voltages to increase the speed of rotation of the motor when the phase difference is positive.

2. The method according to claim 1,
    wherein adjusting the one or more exciting voltages is further based on the one or more currents.

3. The method according to claim 1,
    wherein calculating the phase difference comprises subtracting the back electromotive force voltage phase from the current phase to calculate the phase difference.

4. The method according to claim 1,
    wherein the one or more exciting voltages are applied to a stator of the motor; and
    wherein the one or more currents are detected from the stator of the motor.

5. The method according to claim 1, the method further comprising:
    measuring a direct current link voltage; and
    calculating one or more back electromotive force voltages further based on the direct current link voltage.

6. The method according to claim 5, the method further comprising:
    applying a voltage low pass filter to the direct current link voltage to generate a filtered direct current link voltage signal; and
    calculating one or more back electromotive force voltages further based on the filtered direct current link voltage signal.

7. The method according to claim 1, the method further comprising:
    measuring one or more motor voltages from the motor; and
    calculating one or more back electromotive force voltages further based on the motor voltages.

8. The method according to claim 7, the method further comprising:
    applying a voltage low pass filter to each of the one or more motor voltages to generate one or more filtered motor voltage signals; and calculating the one or more back electromotive force voltages is further based on the one or more filtered motor voltage signals.

9. The method according to claim 1, the method further comprising:
applying a current detection low pass filter to each of the one or more currents to generate one or more filtered current signals; and
wherein calculating the one or more back electromotive force voltages is based on the one or more filtered current signals.

10. The method according to claim 9,
wherein adjusting the one or more exciting voltages is further based on the one or more filtered current signals.

11. The method according to claim 1,
wherein the one or more exciting voltages are sinusoidal pulse width modification voltages varying at a fixed frequency.

12. The method according to claim 1,
wherein the motor is a multi-phase motor having multiple phase coils.

13. The method according to claim 12,
wherein applying the one or more exciting voltages comprises applying an exciting voltage to each phase coil of the multi-phase motor;
wherein measuring the one or more currents comprises measuring one current from each phase coil of the multi-phase motor;
wherein calculating the one or more back electromotive force voltages comprises calculating one back electromotive force voltage in each phase coil of the multi-phase motor based on the current in each phase coil of the multi-phase motor; and
wherein adjusting the one or more exciting voltages comprises adjusting the one or more exciting voltages based on the back electromotive force voltages.

14. The method according to claim 13,
wherein adjusting the one or more exciting voltages is further based on the currents.

15. The method according to claim 14,
wherein measuring the one or more currents comprises measuring a first current from a phase first coil of the multiple phase coils of the multi-phase motor, and calculating a last current in a last phase coil in each phase coil of the multi-phase motor based on the measured first current;
wherein calculating the one or more back electromotive force voltages comprises calculating one back electromotive force voltage in each phase coil of the multi-phase motor based on the currents measured or calculated in each coil of the multi-phase motor; and
wherein adjusting the one or more exciting voltages comprises adjusting the one or more exciting voltages based on the back electromotive force voltages.

16. The method according to claim 15,
wherein measuring the one or more currents further comprises measuring one or more subsequent currents from one or more subsequent coils of the multiple coils of the multi-phase motor and calculating the last current further based on the one or more subsequent currents.

17. A method for controlling a motor, the method comprising:
applying one or more exciting voltages to the motor;
measuring one or more currents from the motor;
calculating one or more back electromotive force voltages based on the one or more currents; and
adjusting the one or more exciting voltages based on the one or more back electromotive force voltages,
wherein adjusting the one or more exciting voltages comprises:
calculating a current phase based on the one or more currents; calculating a back electromotive force voltage phase based on the one or more back electromotive force voltages;
calculating a phase difference based on the current phase and the back electromotive force voltage phase;
applying a low pass phase difference filter to the phase difference to generate a filtered phase difference signal; and
adjusting the one or more exciting voltages based on the filtered phase difference signal.

18. A motor control system for controlling a motor, the motor control system comprising:
an inverter circuit configured to apply one or more exciting voltages to the motor;
a current detection circuit coupled with the inverter circuit, the current detection circuit configured to measure one or more currents from the motor; and
a control unit coupled with the inverter circuit and the current detection circuit, the control unit configured to calculate one or more back electromotive force voltages based on the one or more currents,
the control unit further configured to adjust the one or more exciting voltages based on the one or more back electromotive force voltages,
wherein, to adjust the one or more exciting voltage, the control unit is further configured to:
calculate a current phase based on the one or more currents; calculating a back electromotive force voltage phase based on the one or more back electromotive force voltages;
calculate a phase difference based on the current phase and the back electromotive force voltage phase;
decrease amplitudes of the one or more exciting voltages to slow down speed of rotation of the motor when the phase difference is negative; and
increase the amplitudes of the one or more exciting voltages to increase the speed of rotation of the motor when the phase difference is positive.

* * * * *